US008922247B2

(12) United States Patent
Myers et al.

(10) Patent No.: US 8,922,247 B2
(45) Date of Patent: Dec. 30, 2014

(54) POWER CONTROLLING INTEGRATED CIRCUIT AND RETENTION SWITCHING CIRCUIT

(75) Inventors: James Edward Myers, Cambridge (GB); David Walter Flynn, Cambridge (GB); John Philip Biggs, Cambridgeshire (GB)

(73) Assignee: ARM Limited, Cambridge (GB)

( * ) Notice: Subject to any disclaimer, the term of this patent is extended or adjusted under 35 U.S.C. 154(b) by 1057 days.

(21) Appl. No.: 12/926,498

(22) Filed: Nov. 22, 2010

(65) Prior Publication Data

US 2011/0181343 A1 Jul. 28, 2011

Related U.S. Application Data

(63) Continuation-in-part of application No. 11/920,364, filed on Nov. 14, 2007, now Pat. No. 7,863,778.

(60) Provisional application No. 61/300,512, filed on Feb. 2, 2010.

(51) Int. Cl.
*H03K 19/094* (2006.01)
*H03K 19/096* (2006.01)
*H03K 3/00* (2006.01)
*H03B 1/00* (2006.01)
*G06F 17/50* (2006.01)
*H03K 19/00* (2006.01)

(52) U.S. Cl.
CPC ........ *G06F 17/5068* (2013.01); *H03K 19/0016* (2013.01); *G06F 2217/78* (2013.01)
USPC ................. 326/83; 326/93; 327/108

(58) Field of Classification Search
CPC .............. H01L 25/0207; H01L 25/028; H01L 25/0292; H03K 19/003

USPC ................. 326/82, 83, 93, 95; 327/108, 109, 327/208–212, 214, 215; 365/185.07, 154, 365/156, 189.09, 226
See application file for complete search history.

(56) References Cited

U.S. PATENT DOCUMENTS 6,184,700 B1 * 2/2001 Morris ............................ 326/14
7,737,720 B2 * 6/2010 Idgunji et al. ................... 326/33
(Continued)

OTHER PUBLICATIONS

Royannez et al., "90nm Low Leakage SoC Design Technique for Wireless Applications," *Solid-State Circuits Conference*, 2005 pp. 138-140.
Ling, "Damned If You Do", *New Electronics*, Northwood Publications, 2005, pp. 27-28.

(Continued)

*Primary Examiner* — Dylan White
(74) *Attorney, Agent, or Firm* — Nixon & Vanderhye P.C.

(57) ABSTRACT

A power control integrated circuit is provided having a voltage switching device and a retention switching device that has an input from an overdrive voltage supply such that in a retention enabled configuration a retention switching device is switched on more strongly relative to being both coupled to and driven from the voltage supply input signal associated with the voltage switching device. An overdriven retention switching device is provided as a separate entity from the voltage switching device itself and a computer readable storage medium is provided storing a data structure comprising a standard cell circuit definition for use in generating validating the circuit layout of a circuit cell of an integrated circuit. The circuit cell comprising an overdriven retention switching device. A further data structure corresponding to a standard cell is provided comprising an overdriven retention switching device and a voltage switching device and yet a further standard cell data structure is provided comprising an overdriven voltage switching device.

32 Claims, 12 Drawing Sheets

(56) References Cited

U.S. PATENT DOCUMENTS

| | | | |
|---|---|---|---|
| 7,746,137 B2* | 6/2010 | Saint-Laurent et al. | 327/200 |
| 8,519,775 B2* | 8/2013 | Idgunji et al. | 327/534 |
| 2002/0027034 A1* | 3/2002 | Tsutsumikoshi | 180/227 |
| 2004/0263237 A1 | 12/2004 | Kim et al. | |
| 2005/0083082 A1* | 4/2005 | Olofsson | 326/95 |
| 2009/0079469 A1* | 3/2009 | Ogata | 326/38 |
| 2012/0326772 A1* | 12/2012 | Myers et al. | 327/543 |
| 2013/0027123 A1* | 1/2013 | Idgunji et al. | 327/543 |
| 2013/0111130 A1* | 5/2013 | McCombs et al. | 711/118 |

OTHER PUBLICATIONS

Kim, "Experimental Measurement of a Novel Power Gating Structure with Intermediate Power Saving Mode", *2004 International Symposium*, pp. 20-25.

Kawaguchi et al., A Super Cut-Off CMOS (SCCMOS) Scheme for 0.5-V Supply Voltage with Picoampre Stand-By Current, *IEEE Journal of Solid-State Circuits*, vol. 35, No. 10, Oct. 2000, pp. 1498-1501.

Singh et al., "Enhanced Leakage Reduction Techniques Using Intermediate Strength Power Gating", *IEEE Transactions*, vol. 15, No. 11, Nov. 2007, pp. 1215-1224.

* cited by examiner

Disclosed enhanced header circuit incorporating inrush current limitation

POWER CONTROLLING INTEGRATED CIRCUIT AND RETENTION SWITCHING CIRCUIT

This application is a continuation-in-part of U.S. application Ser. No. 11/920,364 filed Nov. 14, 2007 and claims priority of U.S. provisional application No. 61/300,512 filed Feb. 2, 2010 and the subject matter of both of these applications is hereby incorporated by reference in the present specification.

BACKGROUND OF THE INVENTION

1. Field of the Invention

The present invention relates to the field of integrated circuits. In particular, the present invention relates to power controlling integrated circuits, retention integrated circuits and corresponding standard circuit cells.

2. Description of the Prior Art

It is known to provide voltage switching devices in integrated circuits for coupling a voltage supply input to a voltage supply output in response to a power control input signal. Such voltage switching devices are useful components for all sorts of integrated circuits.

Modern integrated circuits comprise System-on-Chip (SoC) designs comprising perhaps millions of transistor gates. Design and fabrication of such complex System-on-Chip circuits is typically accomplished by making use of Computer Aided Design tools and the use of standard cell libraries comprising standard sub-components providing representations of different types of logic gates (e.g. AND, NAND, XOR) or storage functions (e.g. flip flops or latches) together with transistor interconnect structures. Thus Standard cell methodology helps circuit designers to scale Application Specific Integrated Circuits (ASICs) from comparatively simple single-function integrated circuits comprising several thousands of gates to complex multi million gate System-on-Chip devices.

As the complexity of System-on-Chip designs increases, circuit performance characteristics such as dynamic and leakage power savings are becoming increasingly important to enable longer battery life and also to reduce system fabrication cost. Accordingly, dynamic and leakage power reduction is a key focus of circuit designers. Dynamic power can be reduced by lowering the operation voltage for the entire chip or for certain blocks or sections of a chip and several distinct on-chip voltage islands can be implemented by using voltage level shifters. However, the reduction in physical size of semiconductor components on modern integrated circuits has lead to a trend to use lower threshold-voltage circuit elements because these can be made to perform voltage switching more rapidly. The reduction in threshold voltages can have a side effect of increasing the power consumption of an integrated circuit due to an increase in leakage current.

It is known to reduce leakage power in an integrated circuit by, for example, powering down blocks of circuitry of the integrated circuit by using on-chip power gates by switching these to either power or ground and isolation gates between elements within the circuit to prevent floating inputs or outputs arising when portions of the integrated circuit are powered down, which could otherwise result in unpredictable or incorrect operation elsewhere. However, when powering down parts of the chip, it may be necessary to maintain the state of some chip elements. This can be done by the use of retention flip-flops, and retention latches. Such state retention mechanisms sometimes use so called "balloon latches".

Whilst previously known techniques have been effective in reducing leakage current they typically have a high associated overhead in terms of both the circuit elements (e.g. balloon latches or retention latches) needed to support the additional functionality and in terms of the circuit complexity and control routing. These factors typically lead to a requirement to increase the circuit die area. Thus whilst previously known power controlling mechanisms address reducing leakage current they can inadvertently introduce new complexities and overheads when the circuits incorporating them are fabricated. Accordingly, there is a requirement for a power control integrated circuit that offers a reduction in leakage current when the integrated circuit is powered down or is operating in a data retention mode yet reduces the overhead associated with the leakage current reduction circuitry.

SUMMARY OF THE INVENTION

According to a first aspect, the present invention provides a power control integrated circuit comprising:

a voltage switching device having a voltage supply input (Vin) and a voltage supply output (Vout) and wherein said voltage supply output is switchably coupled to said voltage supply input in response to a power control input signal such that in a power on configuration of said voltage switching device said voltage supply output is coupled to said voltage supply input;

a retention switching device (120, 220) coupled to said voltage switching device and configured to switchably couple said voltage supply output to said voltage supply input in response to a retention enable signal such that in a retention enabled configuration of said retention switching device said voltage supply output corresponds to a retention voltage reduced relative to said voltage supply input;

wherein said retention switching device (120, 220) has a further voltage input from an overdrive voltage supply (Vod, Vssod) such that in said retention enabled configuration, said retention switching device is switched on more strongly relative to being both coupled to said voltage supply input signal and driven from said voltage supply input signal and wherein in a power off configuration of said voltage switching device, said voltage supply output is determined by said retention switching device.

The present invention recognises that a voltage switching device can be provided with a retention switching device having reduced leakage current by arranging that the retention switching device is coupled to the voltage supply input but also to an overdrive voltage supply in response to a retention enable signal. In a retention enable configuration the retention switching device is switched on more strongly relative to being both coupled to and driven from the voltage input supply signal alone. When the voltage switching device is in a power off configuration, the voltage supply output of the voltage switching device is determined by the state of the retention switching device thereby providing a retention voltage that is reduced relative to the voltage supply input, yet sufficient to maintain the state of logic connected to the voltage supply output.

Provision of an overdriven retention switching device allows implementation of a low latency and low leakage retention mode that does not require software to save the state of logic connected to the voltage output and reduces the power and circuit area requirements associated with previously known retention mechanisms such as balloon latches. Furthermore, the overdriven retention switching devices according to the present technique can be used in addition to balloon latches to reduce leakage of circuit elements of the balloon latch itself. By overdriving the retention switching device, the switching device can be turned on more strongly relative to being coupled only to a voltage supply input. This allows the retention switching device to be reduced in size (area) yet still supply the requirement retention voltage for the logic connected to the voltage supply output. The reduction in size from the overdriving of the retention switching device reduces the leakage current when the power control integrated circuit is operating in a power off configuration. It also lowers the current requirement relative to a retention switching device that is not overdriven. The circuit area overhead of the retention switching device is small when compared to the circuit area of the voltage switching device itself so the area overhead associated with providing the retention functionality is reduced.

It will be appreciated that the voltage switching device of the power control integrated circuit could take a number of different forms. However, in one embodiment the voltage switching device is a header switching device in which the voltage supply input corresponds to a positive supply voltage and the overdrive voltage supply is greater than the voltage supply input.

In alternative embodiments, the voltage switching device is a footer switching device in which the voltage supply input corresponds to a ground voltage level and the overdrive voltage supply is less than the voltage supply input. These configurations enable the characteristics of transistors such as Field Effect Transistors (FET) to be taken into account, whereby NFETs are more efficient at performing a pull-down in voltage whereas PFETs are more efficient at performing a pull-up in voltage level.

It will be appreciated that the voltage switching device could be provided as a conventional voltage switching device that is connected only to the voltage supply input and the voltage supply output but not to the overdrive voltage supply. However, in some embodiments, the voltage switching device as well as the retention switching device is connected to the overdrive voltage supply. In particular, in these embodiments a voltage switching device has an overdrive input for coupling the voltage switching device to the overdrive voltage supply when one of: (i) the voltage switching device is in the power off configuration and the retention switching device is configured such that the voltage supply output is decoupled from voltage supply input; and (ii) the voltage switching device is in the power off configuration and the retention switching device is configured such that the voltage supply output is coupled to the voltage supply input via the retention switching device. In these embodiments, the overdriving of the voltage switching device (in addition to the overdriving of the retention switching device) enables leakage power to be reduced in a power off configuration of the power control integrated circuit by overdriving at least part of the voltage switching device to a off state to reduce the leakage current relative to that which would exist if that portion of the voltage switching device were driven off by an input signal at the level of the voltage supply input level.

It will be appreciated that the voltage switching device could be coupled to the overdrive voltage supply in a number of different ways via any one of a number of different circuits, for example, by using half latch circuit or an inverter circuit. However, in some embodiments, the switching device is coupled to the overdrive voltage supply via a first voltage level shifter and the first voltage level shifter is controlled by the power control input signal. The power control input signal provides convenient digital control of the connection of the voltage switching device to the overdrive voltage. By way of contrast, previously known circuits that provide super cut-off of a voltage switching device typically do so via an analogue mechanism such as an analogue adjustment of the transistor gate voltage of the voltage switch.

In some embodiments the first voltage level shifter that couples the overdrive voltage supply to the voltage switching device comprises a first inverter. In other embodiments the first voltage level shifter comprises a half latch circuit. Both the inverter and the half latch are easy to implement and inexpensive to fabricate.

In some such embodiments where the first voltage level shifter comprises a first inverter, the first inverter comprises a pair of stacked transistors biased by the input supply voltage. The use of stacked transistors can exploit the so called "stack effect" of transistors to mitigate any increased leakage that could result from forward-biasing of pull-up stacks and forward-biasing of transistor wells as a result of connecting the switching devices to the overdrive voltage supply. Using a common well bias allows reduced area by avoiding well separation physical design rules.

Although the voltage supply input could be configured to be variable and the overdrive voltage supply could be configured to have a predetermined value, in some embodiments the voltage supply input is a substantially fixed input voltage whereas the overdrive voltage supply is configured such that it is selectable from a range comprising a plurality of overdrive voltages. Enabling the overdrive voltage to be selectable from a range of different voltages provides flexibility in the circuit performance characteristics enabling a user of the circuit to more finely-tune its performance to suit particular required performance characteristics.

It will be appreciated that the retention switching device could be coupled to the overdrive voltage supply in a number of different ways via a number of different circuit arrangements, but in some embodiments the retention switching device is coupled to the overdrive voltage supply via a second voltage level shifter and the second voltage level shifter is controlled by the retention enable signal. Control of the second voltage level shifter by the same retention enable signal that implements the retention enabled mode of the power controlling integrated circuit provides convenient digital control of both the retention mechanism and the leakage characteristics of the retention switching device. By buffering control of the retention switching device using the retention enable signal the number of circuit elements that must be connected to the overdriven voltage supply can be reduced and thus the adverse impact of the retention switching device on circuit area can also be reduced.

In some such embodiments where the overdrive voltage supply is connected to the retention switching device via the second voltage level shifter, the second voltage level shifter comprises a second inverter. In yet further alternative embodiments the second voltage level shifter comprises a half latch circuit. These circuits are simple to implement and easy to fabricate.

In some embodiments where the second voltage level shifter comprises a second inverter, the second inverter comprises a pair of stacked transistors biased with the input supply voltage. The use of stacked transistors in the second inverter mitigates the effects of any increased leakage that can occur due to the inverter being connected to the overdriven voltage supply.

It will be appreciated that the voltage switching device and the retention switching device could be implemented as any type of switching device e.g. any type of transistors. However, in some embodiments at least one of the retention switching device and voltage switching device comprises a field effect transistor. Such field effect transistors are comparatively inexpensive to manufacture and their characteristics are well understood.

In some embodiments of the power control integrated circuit an inrush protection switching device is provided. This is controlled by the retention enable signal and configured to resist an "inrush" of current when the power control integrated circuit is switched from a retention mode to a full power-on mode. An inrush protection switching device such as a potential divider can be used in this way to mitigate the effects that can arise due to a sudden increase in current due to a transition of the power controlling circuit from a retention mode to a full power on mode. An inrush of current has the potential to cause a drop in the voltage on the voltage supply input. This drop in voltage may in turn cause logic elements connected to the voltage supply output, which were in a retention mode prior to the transition to full power-on mode, to loose the contents of the data held in the retention latch. Providing an inrush protection switching device to resist this inrush current reduces the likelihood that data held in the retention switching device will be lost as a result of a sudden increase in the current associated with a transition of the retention enable signal and the power control input signal.

In some embodiments where an inrush protection switching device is provided to resist an inrush of current when the power control integrated circuit switches from a retention mode to a full power-on mode, the inrush protection switching device is coupled between the voltage supply input and an input of the voltage switching device. This enables the inrush protection switching device to act as a potential divider which readily enables the inrush current to be controlled. In some such embodiments, the voltage switching device comprises a field effect transistor and the input of the voltage switching device to which the inrush protection switching device is coupled comprises a gate of the voltage switching device. Thus the voltage on the gate of the voltage switching device can be appropriately selected by the sizing of the inrush protection switching device so that the amount of current sourced by the transistor of the voltage switching device can be reduced as desired by the circuit designer so as to ensure that the inrush of current does not cause deleterious behaviour such as loss of data held in the retention latches.

It will be appreciated that the inrush protection switching device could comprise any one of a number of different circuit configurations, but in some embodiments the inrush protection switching device comprises a field effect transistor of a type matching the field effect transistor used for the voltage switching device, the type being one of a PFET (Positive-channel Field Effect Transistor) and an NFET (Negative-channel Field Effect Transistor). This is cost-effective to implement and easy to control.

In some embodiments where an inrush protection switching device is provided to the power control integrated circuit, the electrical characteristics of the inrush protection switching device are balanced against electrical characteristics of the voltage switching device to effect the resistance to the inrush of current upon a transition between the retention mode and a full power on mode.

In some embodiments, the power control integrated circuit in which the coupling between the retention switching device and the overdrive voltage supply is effected via a first voltage level shifter controlled by the power control input signal, the circuit further comprises a first buffering circuit element coupled to an output of the first voltage level shifter and configured to buffer the power control input signal. Buffering of the power control input signal in this way enables the first buffering circuit to be conveniently controlled via the same control input as the voltage switching device itself. This results in the buffering being an always-on type of buffering and thus reduces leakage current when the power gates are in super cut-off mode. Furthermore, providing the first buffering circuit element in physical proximity to the first voltage level shifter enables the first buffering circuit element to be able to derive its power supply from a voltage rail of the voltage level shifter itself. By arranging for the buffering circuit element to be responsive to the voltage supply output (due to its control via the power control input signal) allows a delay to be introduced between the power control input signal causing the voltage switching device to switch on and the buffer circuit element propagating that power control input signal as the buffered power control input signal. This can reduce peak current and hence reduce power surges.

In some such embodiments the first buffering circuit element is powered by the to voltage supply input. This provides a convenient mechanism via which to power the buffering.

In some embodiments of the power control integrated circuit in which the retention switching device is coupled to the overdrive voltage supply via a second voltage level shifter that is controlled by the retention enable signal, the circuit further comprises a second buffering circuit element coupled to an output of the second voltage level shifter and configured to buffer the retention enable signal. This reduces leakage that can arise, for example, if always-on buffering were to be provided for buffering of the retention enable signal and enables the power supply for the second buffering circuit element to be conveniently derived from a voltage rail of the second voltage level shifter itself. It also provides a similar reduction in current surges to the reduction provided by the first buffering circuit element in respect of buffering of the power control input signal. In some such embodiments the second buffering circuit element is powered by the voltage supply input of the voltage switching device.

According to a second aspect the present invention provides a power control integrated circuit cell for forming part of an integrated circuit, said power control integrated circuit cell comprising:

a voltage switching device having a voltage supply input (Vin) and a voltage supply output (Vout) and wherein said power supply output is switchably coupled to said voltage supply input in response to a power control input signal such that in a power on configuration of said voltage switching device said voltage supply output is coupled to said voltage supply input;

wherein said voltage switching device has a further voltage input from a overdrive voltage supply such that when said voltage switching device is in a power off configuration in which said voltage supply output is decoupled from said voltage supply input, said voltage switching device is switched off more strongly relative to said voltage switching device being both coupled to said voltage supply input signal and driven from said voltage supply input signal.

According to this aspect of the present invention, it is recognised that provision of a power control integrated circuit in the form of a standard cell comprising both a voltage supply input and a voltage supply output within the standard cell itself together with the connection of the voltage switching device to the overdrive voltage supply, provides a circuit building block that is convenient to use and offers a reduction in leakage current due to the fact that the voltage switching device can be switched off more strongly due to its connection to the overdrive voltage supply.

According to a third aspect the present invention provides a power controlling integrated circuit comprising:

a retention switching device having a voltage supply input (Vin) and a voltage supply output (Vout) and wherein said voltage supply output is switchably coupled to said voltage supply input in response to a retention enable signal such that when said coupling is enabled said voltage supply output corresponds to a retention voltage reduced relative to said voltage supply input;

wherein said retention switching device has an input from an overdriven voltage supply such that when said retention switching device is enabled it is switched on more strongly relative to being both coupled to said voltage supply input signal and driven from said voltage supply input signal.

According to this aspect, the present invention recognises that a retention switching device can be provided that is coupled to an overdriven voltage supply, which enables the retention switching device to be switched on more strongly relative to the retention switching device being both coupled to and driven from the voltage supply input signal alone. This enables a reduction of leakage current in a retention mode. Although applying "super cut-off" and "boosted-gate" to voltage switching devices is previously known, overdriving of a retention switching device according to the present technique has not been previously suggested and its advantages in terms of leakage current reduction have not previously been recognised.

According to a fourth aspect the present invention provides a computer-readable storage medium storing a data structure comprising a standard cell circuit definition for controlling a computer to generate and validate a circuit layout of a circuit cell of an integrated circuit, said circuit cell comprising:

a voltage switching device having a voltage supply input (Vin) and a voltage supply output (Vout) and wherein said voltage supply output is switchably coupled to said voltage supply input in response to a power control input signal such that in a power on configuration of said voltage switching device said voltage supply output is coupled to said voltage supply input;

a retention switching device coupled to said voltage switching device and configured to switchably couple said voltage supply output to said voltage supply input in response to a retention enable signal such that in a retention enabled configuration of said retention switching device said voltage supply output corresponds to a retention voltage reduced relative to said voltage supply input;

wherein said retention switching device (120, 220) has a further voltage input from an overdrive voltage supply (Vod, Vssod) such that in said retention enabled configuration, said retention switching device is switched on more strongly relative to being both coupled to said voltage supply input signal and driven from said voltage supply input signal and wherein in a power off configuration of said voltage switching device said voltage supply output is determined by said retention switching device.

According to a fifth aspect, the present invention provides a computer-readable storage medium storing a data structure comprising a standard cell circuit definition for controlling a computer to generate and validate a circuit layout of a circuit cell of an integrated circuit, said circuit cell comprising:

a retention switching device having voltage supply input (Vin) and a voltage supply output (Vout) and wherein said voltage supply output is switchably coupled to said voltage supply input in response to a retention enable signal such that when said coupling is enabled said voltage supply output corresponds to a retention voltage reduced relative to said voltage supply input;

wherein said retention switching device has an input from an overdriven voltage supply such that when said retention switching device is enabled it is switched on more strongly relative to being both coupled to said voltage supply input signal and driven from said voltage supply input signal.

Implementation of the power control integrated circuit as a standard circuit cell comprising both a voltage switching device and an overdriven retention switching device and also provision of a standard cell comprising an overdriven retention switching device without the voltage switching device has the advantages of exposing only digital controls and not requiring external level shifters, thus easing both deployment and verification with existing Electronic Design Automation tools.

According to a sixth aspect, the present invention provides a computer implemented method of designing an integrated circuit comprising the steps of:

selecting at least one standard cell from a standard cell library and incorporating said at least one standard cell in said integrated circuit, said at least one standard cell comprising:

a voltage switching device having a voltage supply input (Vin) and a voltage supply output (Vout) and wherein said voltage supply output is switchably coupled to said voltage supply input in response to a power control input signal such that in a power on configuration of said voltage switching device said voltage supply output is coupled to said voltage supply input;

a retention switching device (120, 220) coupled to said voltage switching device and configured to switchably couple said voltage supply output to said voltage supply input in response to a retention enable signal such that in a retention enabled configuration of said retention switching device said voltage supply output corresponds to a retention voltage reduced relative to said voltage supply input;

wherein said retention switching device (120, 220) has a further voltage input from an overdrive voltage supply (Vod, Vssod) such that in said retention enabled configuration, said retention switching device is switched on more strongly relative to being both coupled to said voltage supply input signal and driven from said voltage supply input signal and wherein in a power off configuration of said voltage switching device said voltage supply output is determined by said retention switching device.

According to a seventh aspect the present invention provides a computer implemented method of designing an integrated circuit comprising the steps of:

selecting at least one standard cell from a standard cell library and incorporating said at least one standard cell in said integrated circuit, said at least one standard cell comprising:

a retention switching device having voltage supply input (Vin) and a voltage supply output (Vout) and wherein said voltage supply output is switchably coupled to said voltage supply input in response to a retention enable signal such that when said coupling is enabled said voltage supply output corresponds to a retention voltage reduced relative to said voltage supply input;

wherein said retention switching device has an input from an overdriven voltage supply such that when said retention switching device is enabled it is switched on more strongly relative to being both coupled to said voltage supply input signal and driven from said voltage supply input signal.

According to an eighth aspect the present invention provides computer implemented method of designing an integrated circuit comprising the steps of:

selecting at least one standard cell from a standard cell library and incorporating said at least one standard cell in said integrated circuit, said at least one standard cell comprising:

a voltage switching device having a voltage supply input (Vin) and a voltage supply output (Vout) and wherein said power supply output is switchably coupled to said voltage supply input in response to a power control input signal such that in a power on configuration of said voltage switching device said voltage supply output is coupled to said voltage supply input;

wherein said voltage switching device has a further voltage input from a overdrive voltage supply such that when said voltage switching device is in a power off configuration in which said voltage supply output is decoupled from said voltage supply input, said voltage switching device is switched off more strongly relative to said voltage switching device being both coupled to said voltage supply input signal and driven from said voltage supply input signal.

According to a ninth aspect, the present invention provides a method of providing power control in an integrated circuit, said method comprising:

switchably coupling a voltage supply input of a voltage switching device in response to a power control input signal such that in a power on configuration of said voltage switching device a voltage supply output of said switching device is coupled to said voltage supply input;

switchably coupling said voltage supply output to said voltage supply input using a retention switching device coupled to said voltage switching device in response to a retention enable signal such that in a retention enabled configuration of said retention switching device said voltage supply output corresponds to a retention voltage reduced relative to said voltage supply input;

wherein said retention switching device (120, 220) has a further voltage input from an overdrive voltage supply (Vod, Vssod) such that in said retention enabled configuration, said retention switching device is switched on more strongly relative to being both coupled to said voltage supply input signal and driven from said voltage supply input signal and wherein in a power off configuration of said voltage switching device said voltage supply output is determined by said retention switching device.

According to a tenth aspect, the present invention provides a method of providing power control in an integrated circuit, said method comprising:

switchably coupling a voltage supply output of a retention switching device to a voltage supply input of said voltage switching device said voltage in response to a retention enable signal such that when said coupling is enabled said voltage supply output corresponds to a retention voltage reduced relative to said voltage supply input;

wherein said retention switching device has an input from an overdriven voltage supply such that when said retention switching device is enabled it is switched on more strongly relative to being both coupled to said voltage supply input signal and driven from said voltage supply input signal.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 2A to 2C represent the voltage switching device in a power on, power off an retention mode respectively;

DESCRIPTION OF PREFERRED EMBODIMENTS

Figure 1A:
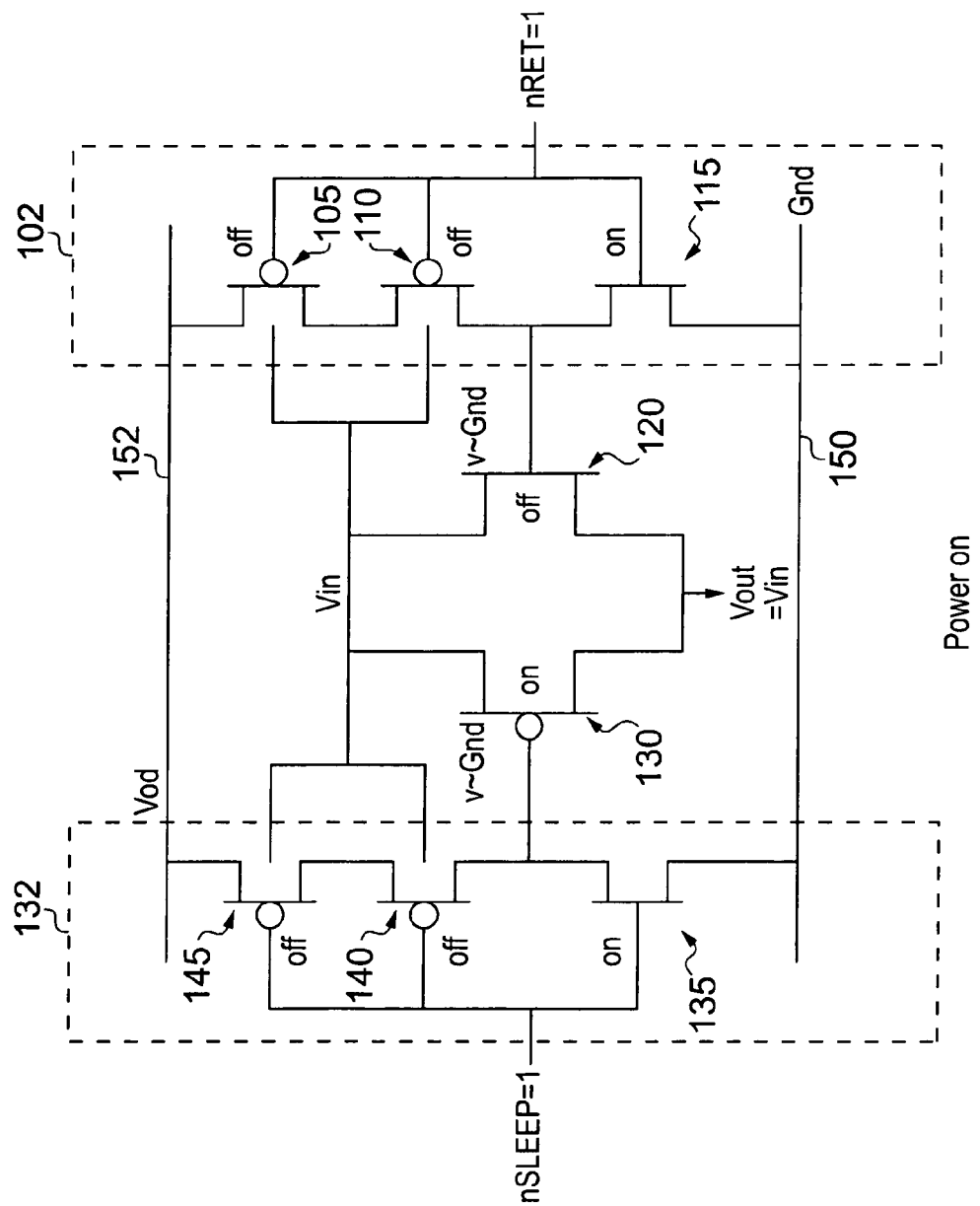
FIG. 1A schematically illustrates a power control integrated circuit comprising a header voltage switching device, the power control integrated circuit being in a full power-on configuration.

FIG. 1A schematically illustrates a power control integrated circuit cell forming part of an integrated circuit according to the first embodiment of the present invention. The integrated circuit cell can be implemented, for example, as a standard cell in a standard cell library for controlling a computer to generate and validate a circuit layout of at least a portion of an integrated circuit. The standard cell entity, which defines properties of a corresponding physical integrated circuit cell, can be provided as a single or a distributed data structure stored on a computer-readable storage medium.

The circuit of FIG. 1A comprises a voltage switching device comprising a PFET transistor 130 which is coupled to a voltage supply input Vin and a voltage supply output Vout. This type of voltage switching device is known as a "header" switching device, in which the input supply voltage Vin corresponds to a positive supply voltage. A different type of power switching device known as a "footer" switching device will be illustrated in FIGS. 2A to 2C as described below. The voltage switching device 130 is coupled to a retention device 120 comprising an NFET transistor 120. In addition to the voltage switching device 130 and the retention device 120, the circuit of FIG. 1A comprises a first inverter 132 consisting of a pair of stacked PFET transistors 140, 145, which are body-biased with the input supply voltage Vin and also an NFET transistor 135.

The first inverter 132 is a specific implementation of a voltage level shifter that is used to couple the header voltage switching device 130 with an overdrive supply voltage Vod from an overdrive voltage rail 152. The first inverter 132 is controlled by a power control input signal nSLEEP, which controls both the state of the inverter 132 and whether or not the voltage switching device 130 is coupled to the overdrive voltage rail 152. The power control integrated circuit of FIG. 1A further comprises a second inverter 102, which is a particular implementation of a voltage-shifting device. In alternative embodiments other types of voltage-shifting device are used. This second inverter 102 is controlled by a retention control input signal nRET, which controls both the state of the inverter 102 and whether or not the retention switching device 120 is coupled to the overdrive voltage rail 152 such that the voltage supply output Vout is switchably coupled to the voltage supply input Vin in response to the retention enable signal "nRET".

In a retention enabled configuration of the retention switching device 120, the voltage supply output Vout corresponds to a retention voltage that is reduced relative to the voltage supply input Vin.

The retention switching device 120 is coupled to the overdrive voltage rail 152 (as well as being coupled to Vin) so that in a retention-enabled configuration the retention switching device 120 is switched on more strongly relative to how strongly it would be switched on if it were both coupled to the voltage supply input signal Vin and driven from the voltage supply input signal Vin. As will be shown in FIGS. 1B and 1C described below, in a power-off configuration of the voltage switching device 130, the voltage supply output Vout is determined by the state of the retention switching device 120.

In the header power control integrated circuit of FIG. 1A, it can be seen that the pair of PFET transistors 140, 145 of the first inverter 132 are stacked such that they are body-biased by the voltage supply input Vin. Similarly, the pair of PFET transistors 105, 110 of the second inverter 102 are stacked such that they are body biased by Vin. The biasing of these PFET transistor pairs with Vin reduces that cell area of the integrated circuit of FIG. 1A and the stacking of these two PFET pairs mitigates leakage current when the device is turned off.

The second inverter 102 is the same as the first inverter 132, but provides level shifting to the retention device 120 rather than to the header voltage switching device 130.

Figure 1B:
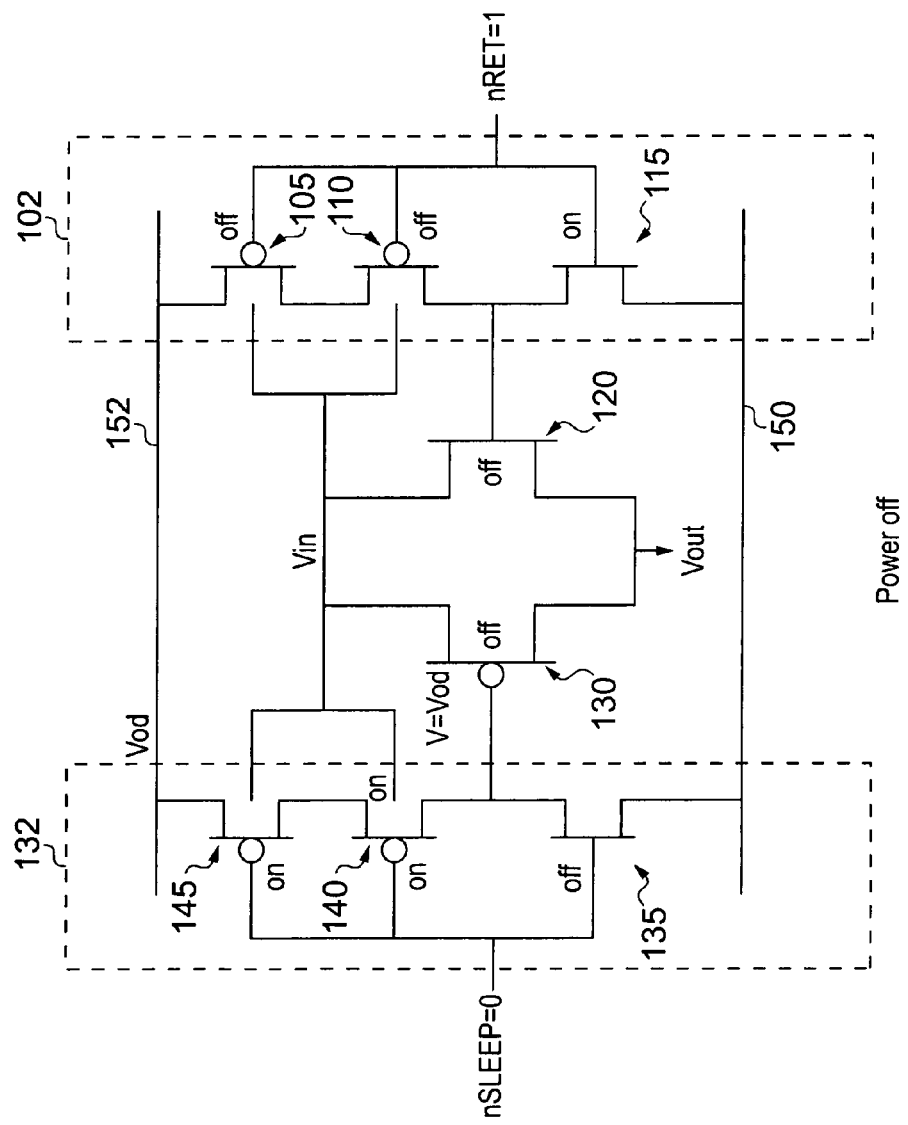
FIG. 1B schematically illustrates the power control integrated circuit of FIG. 1A, but having a header voltage switching device in a power-off configuration.
Figure 1C:
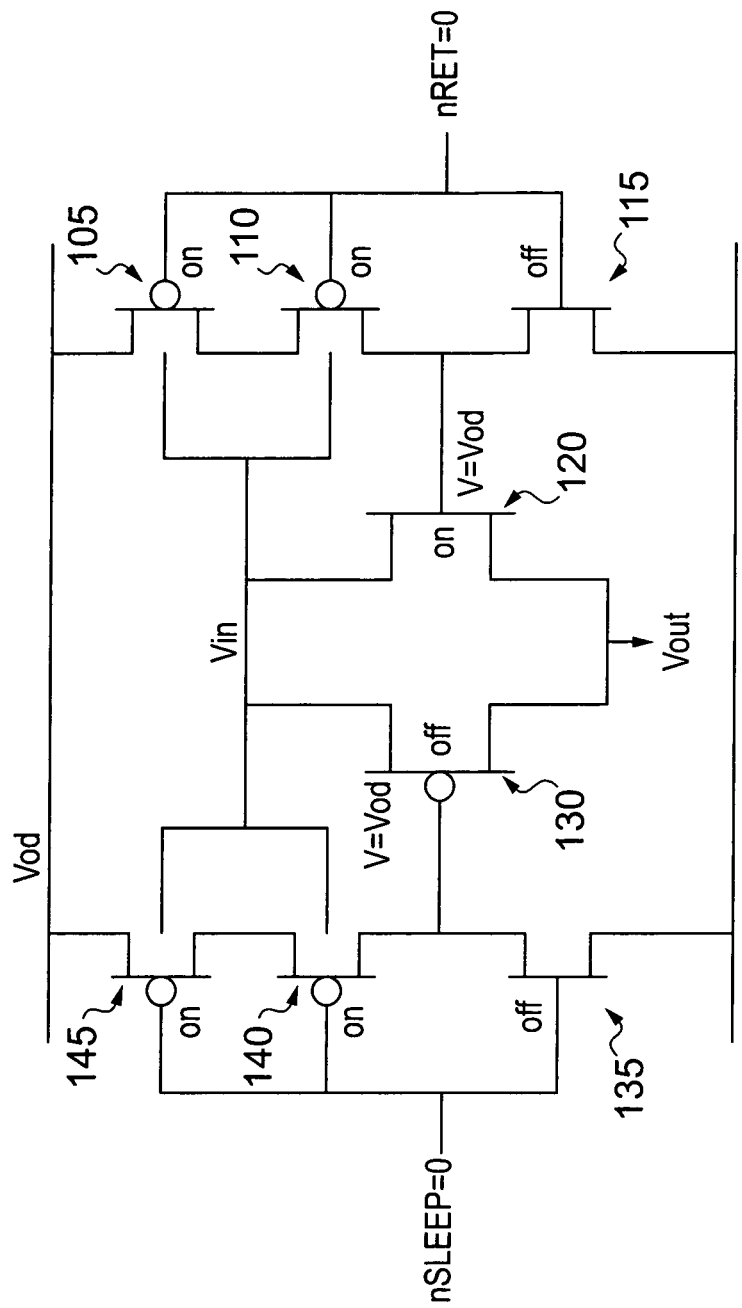
FIG. 1C schematically illustrates the power control integrated circuit of FIG. 1A having a header voltage switching device and a retention switching device but in a retention enabled configuration.

The retention switching device 120 provides a reduced voltage suitable for maintaining storage devices coupled to Vout in a retention state when the nSLEEP and the nRET signals have the values shown in the circuit of FIG. 1C, i.e. when the power control input signal nSLEEP is a logical zero and the retention enable signal nRET is a logical zero. It will be appreciated that the polarities of the logical signals required to induce the power-on state, the power-off state and the retention state depends upon the particular circuit configuration and thus the polarities of logical signals required to induce a particular one of these three states can differ from those in the described embodiments.

The embodiment of FIG. 1A shows the header switching device 130 and the retention switching device 120 in a power-on configuration in which the power control input signal nSLEEP is a logical one and the retention enable signal nRET is a logical one. In this case the PFETs 140,145 of the first inverter 132 are both switched off, whilst the NFET transistor 135 of the first inverter 132 is switched on. As a result, the PFET 130 of the header voltage switching device is connected to the ground voltage rail 150 and is switched on. Since the retention enable signal is a logical one, the PFETs 105, 110 of the second inverter 102 are both switched off, whilst the NFET 115 of the second inverter 102 is switched on. As a consequence, the retention device NFET 120 is coupled to the ground voltage rail 150 and is switched off. Thus the overall configuration of the circuit of FIG. 1A is such that Vout is coupled to Vin and in this mode any logical devices (not shown) powered by the Vout signal are operating in a full power on mode. Although in the embodiment of FIG. 1A, the first voltage level switcher 132 and the second voltage level switcher 102 are implemented as inverters, in alternative embodiments other types of voltage level shifters could be implemented to the same effect. For example, stacked inverters could be used or cross-coupled level shifters or half latches and further alternatives are also possible.

The circuit of FIG. 1A (as well as all of the circuits illustrated in FIGS. 1B to FIG. 5 described below) are implemented as "standard cells". In semiconductor design it is known to use a so called "standard cell" methodology for designing application-specific integrated circuits (ASICs) comprising digital logic features. A standard cell represents an abstraction of a low-level very-large-scale integration (VLSI) layout that is encapsulated into an abstract logic representation such as a logic gate (e.g. AND gate, OR gate). Encapsulation of the detailed circuit layout in a standard cell hides the details at the transistor level but makes them available to the circuit designer at a logical and a functional level. This allows circuits to be designed such that one Engineer focuses on the logical function aspect of the digital design by assembling a plurality of standard cells to form a whole circuit whilst another Engineer, who constructs the interior of the standard cell focuses on the transistor-level implementation and the physical aspect of the circuit design. This facilitates the function of System-on-Chip devices comprising perhaps millions of transistor gates.

The standard cell definition may specify characteristics of the standard cell circuit itself including at least one of: timing characteristics, logical functions, physical interface characteristics and electrical interface characteristics of the circuit. The data structure representing the standard cell may be a single data structure or a distributed data structure, the data structure(s) representing a group of transistor and interconnect structures that provide Boolean logic functions, such as AND, OR, XOR gates or inverters or a storage function such as a flip-flop or latch. According to the present technique, a power-controlling integrated circuit and/or a retention circuit are provided as standard cells. The storage medium on which the standard cell is provided may be non-transitory and it will be appreciated that this storage medium could encompass multiple storage media in the case of the distributed data structure.

An individual standard cell will initially be developed at a transistor level in the form of a transistor "netlist", which is a mode by mode description of transistors and their connections to each other and of their terminals to the external environment. To obtain an abstract version of the standard cell a design program such as SPICE (Simulation Program with Integrated Circuit Emphasis), as described in SPICE (Simulation Program with Integrated Circuit Emphasis) Memorandum No. ERL-M 382, University of California, Berkeley, April 1973 by Nagel and Pederson is used to simulate electronic behaviour of the standard cell netlist by declaring an input stimulus such as a voltage and then calculating the circuit's response. Such SPICE simulations verify whether the netlist implementations and the requested function conform with requirements such as power consumption or signal propagation delay.

A physical representation of the standard cell is produced for the purpose of device fabrication. The standard cell layout view is close to a manufacturing blueprint from the standard cell and is organised into base layers corresponding to different structures of transistor devices and interconnect lines which join together the terminals of transistor formations. The Engineer has the task of making a standard cell layout efficient to manufacture by considering manufacturing costs and this is generally done by minimising the circuit die area yet ensuring that the standard cell speed and power performance requirements are met.

A "standard cell library", as is well known in the art, is a collection of low-level logic functions, flip-flops, latches and buffers. These standard cells are provided as fixed-height, variable width cells. The fixed height enables the standard cells to be placed in rows to facilitate the process of automated digital layout. The standard cells within a standard library are typically layout views of the standard cell designed to reduce delays and circuit area. Key components of the standard cell library are: (i) timing abstractions that provide functional definitions, timing and noise information for each standard cell and (ii) layout abstractions which contain reduced information about the standard cell layouts for use by computer aided design tools used for placing and routing of the circuits. An example of a standard cell library is the ARM standard cell library that provides a platform for designing all types of System-on-Chip designs. The circuit designer can choose between different standard cell library types and optimise their designs for speed, power and/or area. The ARM standard cell libraries, for example, are available from 28 nanometre nodes to 250 nanometre nodes.

A number of SPICE simulations have been performed for circuits such as the circuit illustrated in FIG. 1A. In the circuit of FIG. 1A, the inverter 132, powered by the higher (over-driven) voltage supply Vod is used to drive the gate of the PFET 130 of the header voltage switching device to a higher voltage than Vin and to reduce the required width of 130. The SPICE simulations on a low power 32 nm process show that the reduction in width and therefore leakage current can be up to fifty times relative to a header voltage switch that is not connected (via a level shifter) to an overdriven voltage supply.

One complexity of using a voltage level-shifter to connect the voltage switching device to an overdriven voltage supply is that the N-wells of any inverters or buffers powered by the overdriven voltage (Vod) should be tied to the higher supply voltage, which in turn may require hot N-well separation to be observed and thus resulting in greater silicon area and increased manufacturing costs. Alternatively, the inverters or buffers could be left forward-biased causing increased leakage. However in the arrangement of FIG. 1A, by providing control of the connection to the overdriven voltage Vod from the regular power supply Vin, the number of inverters on the overdriven supply can be reduced thereby reducing the cost of forward-biasing to mitigate the effects of any requirements to increase the circuit die area.

With regard to the retention device 120 in FIG. 1A, the NFET is configured to provide up to a diode drop on the virtual rail to provide a zero-latency leakage retention mode that does not require software to save any state. This is more area efficient than, for example, the previously known balloon latches used to save circuit state in a retention mode. The retention enable signal "nRET" of FIG. 1A is used to control whether the gate of the NFET 120 is overdriven. The gate of the NFET 120 is overdriven only in retention mode shown in FIG. 1C. When the NFET 120 is connected to the overdriven voltage rail 152, it turns on more strongly, which means that it can supply more current. This in turn means that it can be reduced in size yet still supply the required retention voltage to retain the circuit state.

The leakage caused by forward-bias can be aggravated by not fully driving the gates of the circuit to the overdriven voltage unless care is taken with the level shifter design. For example, the known technique of half latch level shifters would help to mitigate this.

FIG. 1B schematically illustrates the power control integrated circuit comprising a header voltage switching device according to an embodiment of the present invention. The circuit components of FIG. 1B are identical to those of FIG. 1A, but in this case the power control input signal NSLEEP and the retention enable signal nRET have values that place the integrated circuit in the power-off configuration. In this particular implementation the power off configuration corresponds to the power control input signal nSLEEP having a value of logical zero and the retention enable signal nRET having a logical value of one. With these input signal values, the PFET transistors 140, 145 of the first inverter are both switched on, whilst the NFET 135 of the first inverter is switched off. The effect of the two PFETs 140, 145 being switched on is that the voltage supply input rail Vin is coupled to the overdriven voltage rail 152. As a consequence, the PFET 130 of the header voltage switching device is switched off but is overdriven in the off state such that it is in a "super cut-off" state.

The overdriving of the PFET device 130 in this off state reduces leakage current relative to the leakage current that would exist if the PFET device 130 were driven off by an input signal only at the voltage level of Vin rather than at the overdrive voltage level Vod. Since the retention enable signal nRET is a logical one, both of the PFETs 105, 110 are switched off whilst the NFET 115 of the second inverter is switched on. This means that the retention switching device 120 is switched off. Since both the retention device NFET 120 and the PFET 130 header voltage switching device are switched off in this configuration, the output signal Vout is no longer coupled to the voltage supply input Vin. In this configuration, the output on the Vout signal is effectively floating and sourcing no current other than the reduced leakage current and this means that the logic powered by the Vout signal is in a power, off mode. Improvements in terms of reduced leakage current relative to previously known voltage switching devices are achieved in this configuration via the coupling of the PFET 130 of the header voltage switching device to the overdriven voltage rail 152.

Note that in the circuit of FIG. 1A the PFET 130 is used for passing a logic value one. It is known in the art that a PFET is more effective at passing a logic value one and less effective at passing a logic value zero. It is also known in the art that an NFET such as the NFET 120 of the retention device of FIGS. 1A to 1C is less effective at passing a logic value of one and more effective at passing a logic value of zero. This is utilised here to deliberately introduce a voltage drop in retention mode.

FIG. 1C schematically illustrates a power control integrated circuit header cell according to an embodiment of the present invention, in which the power control input signal nSLEEP and the retention enable signal nRET are configured such that the circuit is in a retention enabled configuration. As shown in FIG. 1C, the retention enabled configuration corresponds to the power control input signal nSLEEP having a logical value of zero and the retention enable signal nRET having a logical value of zero. In this configuration the PFETs 140, 145 of the first inverter are both switched on, whilst the NFET 135 of the first inverter is switched off. This results in the PFET 130 of the header voltage switching device being coupled to the overdrive voltage Vod and thus being overdriven in an off-state similarly to the FIG. 1B configuration. As a result of the retention enable signal being a logical zero, the two PFET devices 105, 110 of the second inverter are both switched on, whilst the NFET 115 of the second inverter is switched off. This results in the retention device NFET 120 being switched on and coupled to the overdriven voltage rail 152 i.e. the NFET of the header voltage switching device is overdriven to a "boosted gate" mode in the on state. Accordingly, Vout is coupled to Vin via the NFET 120. Since the NFET 120 is less effective at passing a logic value of one than passing a logic value of zero, the coupling of Vin to Vout in this configuration is at a level that is sufficient to maintain logic devices powered by the Vout signal in a retention mode but not in a full power-on mode.

Since each of the power control input signal and the retention enable signal of the circuits of FIG. 1A to FIG. 1C can have a value of either logic zero or logic one, there are clearly four different states that the circuit can assume. However, a state which has not been illustrated is a state in which the nSLEEP signal is a logical one and the nRET input signal is a logic zero. In this configuration the PFET device 130 coupling Vin input voltage source to Vout is turned on, the NFET device 120 coupling the Vin voltage source to the Vout signal is turned on and the Vin voltage source is coupled to the Vout signal by both the PFET device 130 and the NFET device 130. However this mode is inefficient and is not typically used. Accordingly it will not be described further here.

In alternative embodiments to the embodiment of FIG. 1A, the retention switching device corresponding to the inverter 102 and retention device 120 can be implemented as its own self-contained standard cell or as a self-contained circuit provided independently of the power-controlling switch (excluding the header switching device 130 and the first inverter 132). This can then be connected to a distinct power-controlling integrated circuit cell without an inbuilt data retention functionality.

In further alternative embodiments, a distinct circuit or separate standard cell is provided that comprises the voltage switching device 130 and the first inverter 132 that provides a connection to the overdrive voltage rail 152, but excludes the second inverter 102 and retention device 120. In other words a circuit or standard cell comprising an overdriven voltage switch but excluding a retention switching device is provided.

Figure 2A:
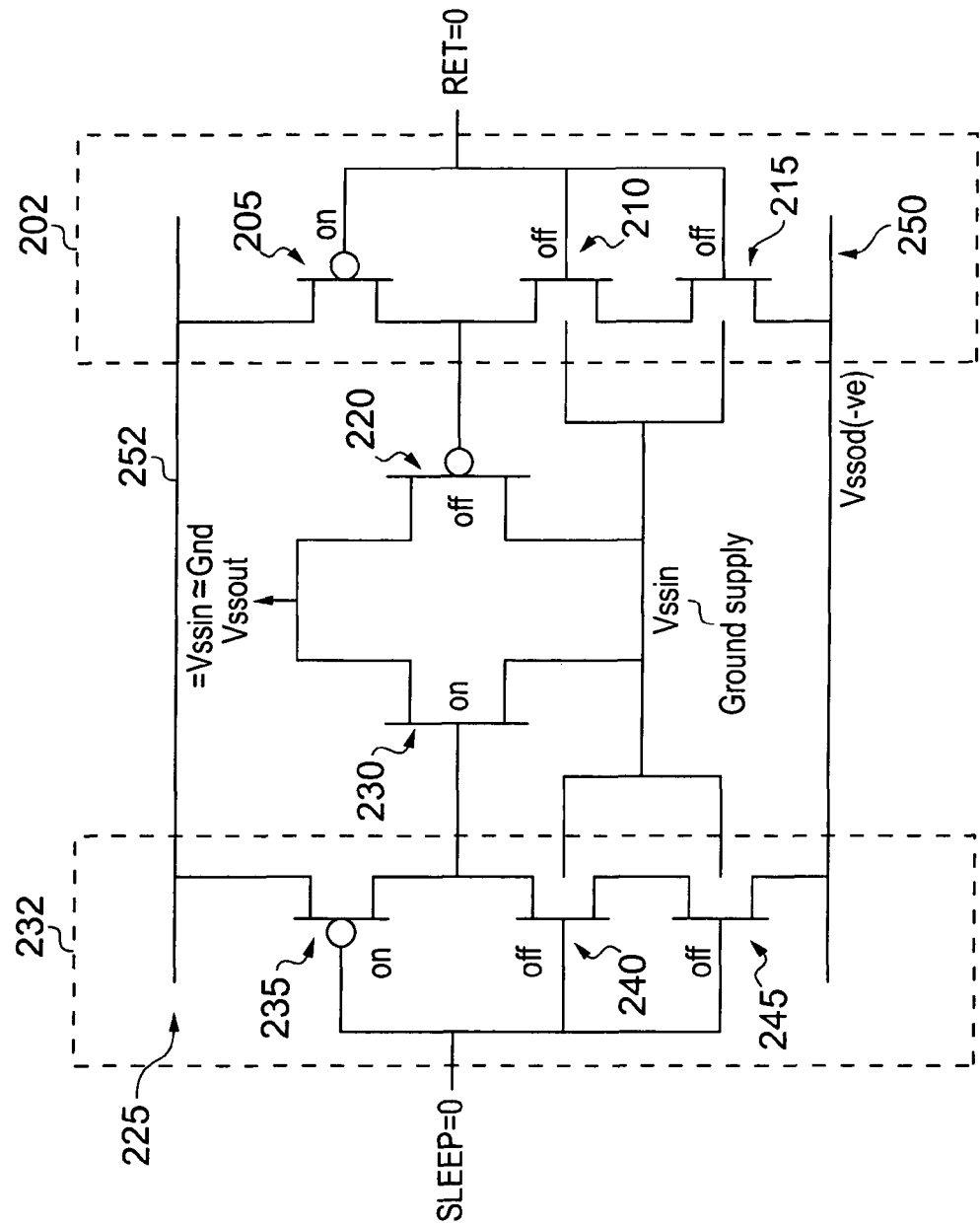
FIGS. 2A, 2B and 2C schematically illustrate a power control integrated circuit similar to the circuit of FIGS. 1A, 1B, 1C but in which the voltage switching device is a footer voltage switching device

FIG. 2A illustrates a power control integrated circuit cell according to a second embodiment of the present invention. The voltage switching device 230 in this embodiment is a footer switching device in which the input supply voltage "Vssin" corresponds to a substantially ground voltage level and wherein the overdrive supply voltage supply "Vssod" is less than the voltage supply input i.e. the overdriven voltage supply rail Vssod is at a negative voltage. As shown in FIG. 2A, the footer voltage switching device comprises an NFET 230 and, a retention device PFET 220, both of which are coupled to the ground voltage supply Vssin and to an output voltage Vssout. The footer voltage switching device 230 and the retention device 220 are both coupled to an overdrive voltage supply rail Vssod 250 and to a further voltage supply rail 252 that in this embodiment is at around −100 mV (although this voltage level is configurable and process specific) via each of a first inverter 232 and a second inverter 202.

In the arrangement of FIG. 2A, the footer voltage switching cell 230 is augmented with the first input inverter 232 controlled by a power control input signal labelled "SLEEP" and powered by a negative overdriven supply voltage Vssod (−ve) 250 that is lower than the ground supply Vssin. The circuit further comprises a second inverter 202 controlled by a retention enable signal labelled RET and powered by the lower voltage Vssin, providing the reduction and leakage current when the circuit is configured to provide a ground connection at a voltage level slightly about the Vssin voltage level to maintain a connected logic circuit in a retention mode. A retention mode is illustrated in more detail in FIG. 2C.

It will be appreciated that in alternative embodiments only the retention voltage of the second inverter 202 could be connected to the overdrive voltage whilst the voltage switching device itself has a standard connection to the voltage supply input and the voltage supply output only. In other words, in some embodiments the retention switch but not the voltage switching device is overdriven whereas in other embodiments the voltage switch but not the retention switch is overdriven. The same applies to the embodiments of FIGS. 1A to 1C.

In yet further alternative embodiments the retention switching device 220 and second level shifting inverter 202 may be provided as its own standard cell with the connections to the overdriven voltage Vssod, but without the voltage switching device itself being included in the standard cell.

In the header power control integrated circuit of FIG. 1A, the PFET pair 140, 145 of the first inverter and the PFET pair 105, 110 of the second inverter 102 were stacked PFET devices. Similarly, in the embodiment of FIG. 2A, the pair of NFET devices 240, 245 of the first inverter 232 are stacked as are the pair of NFET devices 210, 115 of the second inverter 202. These four NFET devices 210, 215, 240, 245 are all body-biased with the ground supply voltage Vssin that is higher than the overdrive voltage provided on the voltage supply rail 250. The forward bias increases leakage but reduces area. Stacking these transistors provides for reduced current leakage when the device is turned off, relative to the leakage of a device in which the NFET devices are forward biased with the ground supply voltage Vssin but not stacked.

Figure 2B:
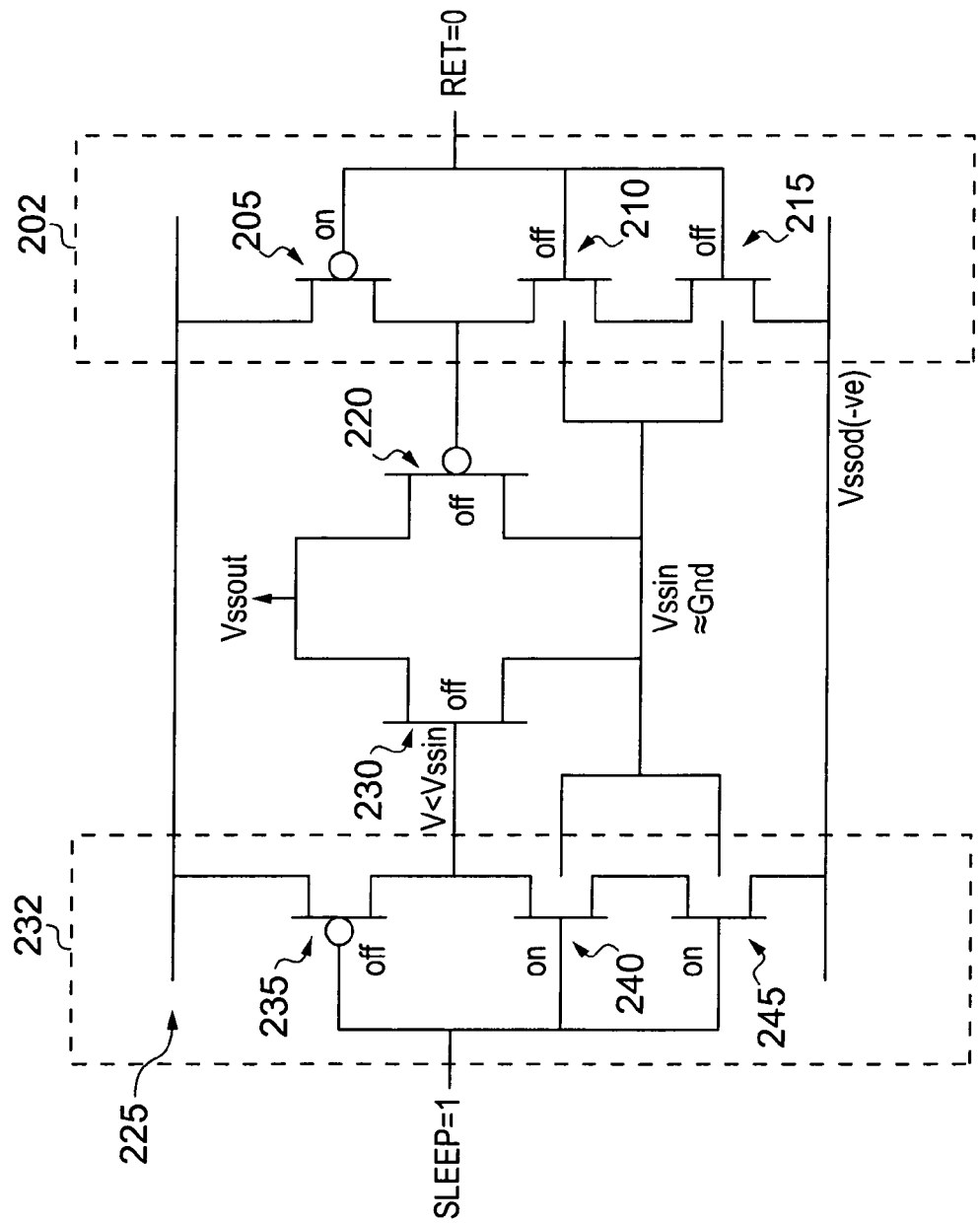
Figure 2C:
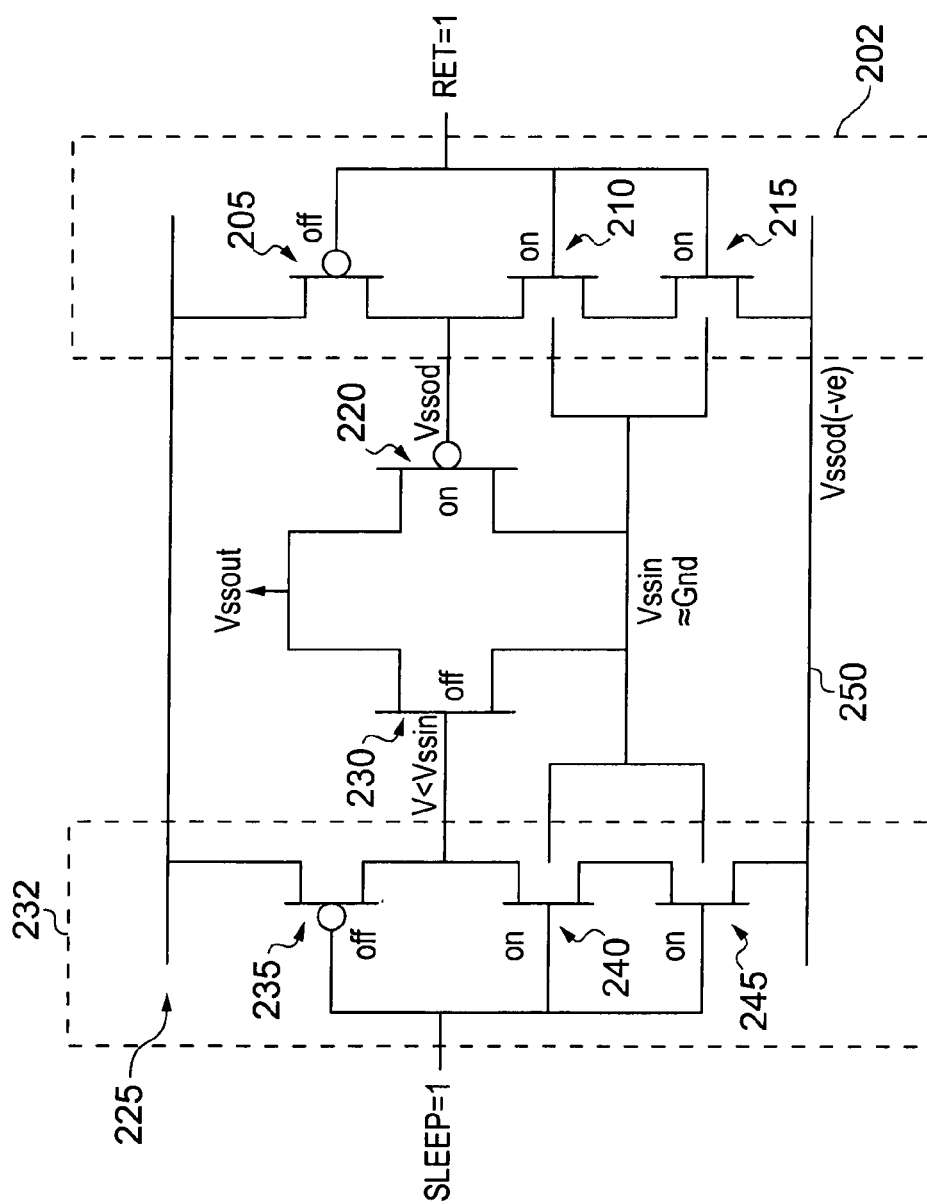

In the arrangement of FIGS. 2B and 2C, when SLEEP=1, the negative overdrive voltage Vssod is applied to the gate of the NFET device 230. This enables the NFET device 230 coupling the Vssin ground supply voltage to the Vssout signal to be overdriven to an off state that is characterised by reduced leakage relative to the same device that is both driven by the voltage level Vssin of the voltage source and coupled to the voltage level Vssin of the voltage source.

FIG. 2A schematically illustrates the state of the footer power control integrated circuit cell in a full power-on mode. In this configuration the power control input signal SLEEP has a logical value of zero whilst the retention enable signal RET also has a logical value of zero. Thus, as shown in FIG. 2A, when SLEEP=0 the PFET 230 of the first inverter 232 is switched on, whilst the two NFETS 240, 245 of the first inverter 232 are switched off. This results in the NFET 230 of the footer voltage switching device being coupled to the voltage supply rail 252 via the PFET 235 and thus switching on. Focusing now on the second inverter 232 driving the retention switching device 220, when the retention enable signal RET=0 the PFET 205 of the second inverter 202 is switched on whilst the pair of NFETs 210, 215 of the second inverter are switched off.

This means that the PFET retention device 220 coupled to the positive voltage rail 252 and thus is switched off. Since the NFET 230 of the footer voltage switching device is switched on whilst the PFET 220 is switched off, the voltage supply input Vssin is coupled to Vssout via the NFET 230, which is more efficient at passing a logic value of zero than passing a logic value of one. In this mode, the logic coupled to the Vssout signal is effectively connected to the ground Vssin and operating in a full power-on mode. None of the transistors are overdriven in this power on configuration of FIG. 2A.

FIG. 2B schematically illustrates a power control integrated circuit for the footer voltage switching device in which the logical values of the power control input signal and the retention enable signal are such that the device is in a power off configuration. In particular, the power control input signal SLEEP equals one whilst the retention enable signal RET equals zero. When SLEEP equals one, the pair of NFET transistors 240, 245 of the first inverter 232 are both switched on whilst the PFET transistor 235 of the first inverter 232 is switched off. As a result, the NFET 230 of the footer voltage switching device is coupled to the overdriven voltage rail 250 at a negative voltage that is lower than the ground potential, which results in the NFET 230 being overdriven to an off state. When RET=0, the pair of stacked NFET transistors 210, 215 of the second inverter 202 are in an off configuration, whilst the PFET 205 of the second inverter 202 is in an on configuration. As a result the input to the PFET 220 corresponding to the retention device is from a positive voltage supply, switching the PFET 220 off. Since both the NFET 230 and the PFET 220 are switched off in this configuration, Vssout is decoupled from Vssin and thus all of the logic (not shown) powered by the Vssout signal is in a power off mode.

The fact that in this configuration SLEEP=1, drives the gate of the NFET device 230 of the footer voltage switching device to an input voltage lower than that of Vssin overdriving it to an off state. This in turn reduces the leakage current relative to leakage current that would exist if the NFET device 230 were driven to an off state by an input signal at the voltage level of Vssin (i.e. if it were not coupled to the overdrive voltage via the first inverter 232). Since both the NFET transistor 230 of the footer voltage switching device and the PFET transistor 220 of the retention device are switched off, Vssout signal is effectively floating and passing no current other than leakage current.

FIG. 2C schematically the power control integrated circuit cell of FIGS. 2A and 2B having a footer voltage switching device, but in this case the logical inputs of the power control input signal and the retention enable signal are such that the device is in a retention-enabled configuration. In particular, the power control input signal (SLEEP) equals one whilst the retention enable signal (RET) equals one.

Since SLEEP=1, the NFET pair 240, 245 of the first inverter 232 are both switched on, whilst the PFET 235 of the first inverter 232 is switched off. This results in the NFET 230 of the footer switching device being coupled to the negative overdrive voltage rail 250 via the stacked NFET pair 240, 245 and thus being overdriven to an off state. Since the retention enable signal RET=1, the pair of stacked NFETs 210, 215 of the second inverter 202 are both switched off whilst the PFET 205 of the second inverter 202 is switched off. Hence the PFET 220 retention device is connected to the negative overdrive voltage rail 250 via the stacked NFETs 210, 215 and is switched on by the overdriven voltage at a voltage level that supports any logic connected to Vssout in a retention mode.

A further mode of the circuit of FIG. 2A is not typically used and corresponds to SLEEP=0 and RET=1. In this case, the NFET device 230 coupling the Vssin input voltage source to the Vssout signal is turned on and the PFET device 220 coupling the Vssin voltage source to the Vssout signal is turned on so that the Vssin voltage source is coupled to the Vssout signal by both the NFET device 230 and the PFET device. This mode is not used because it is inefficient.

Figure 3:
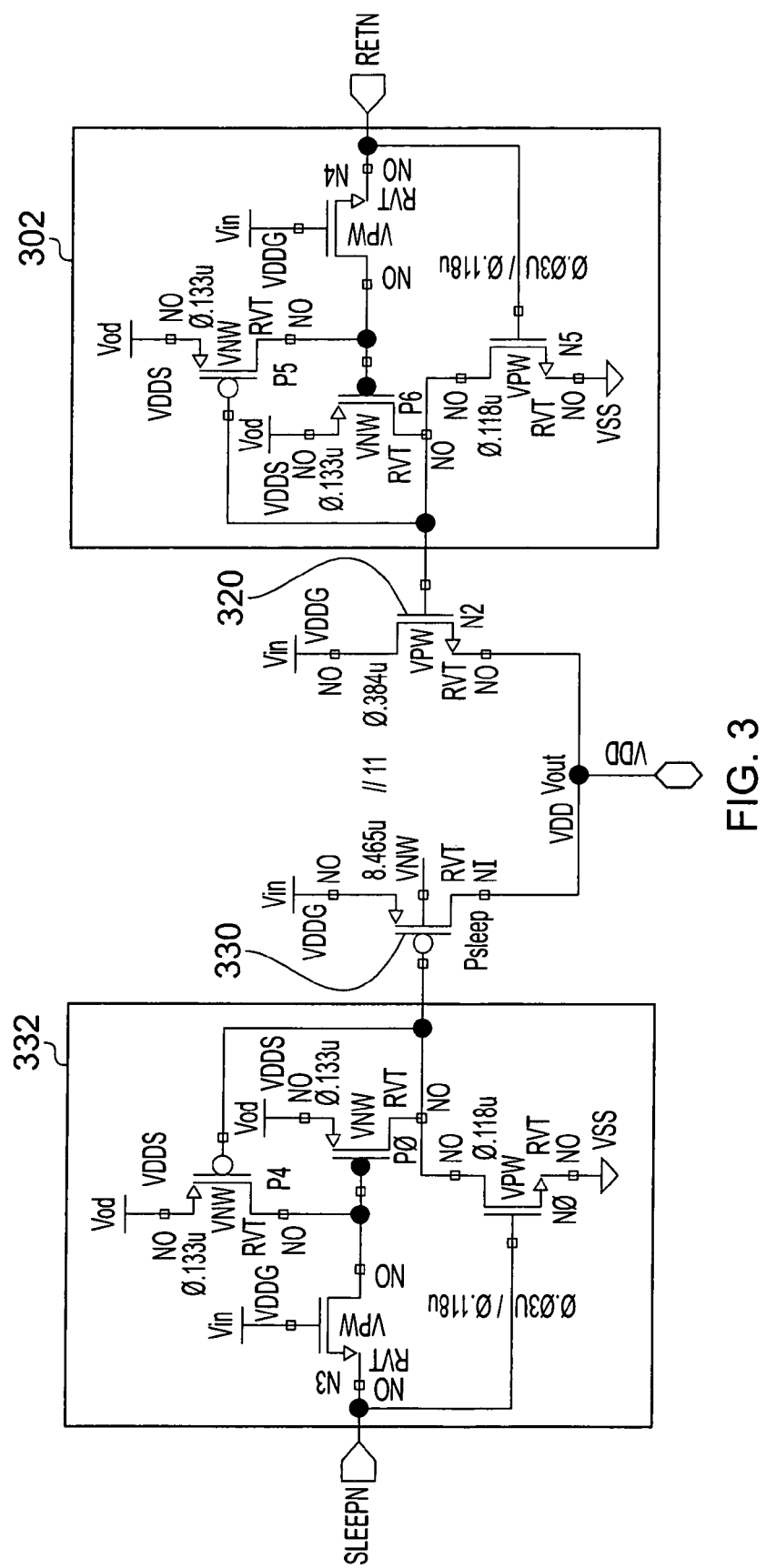
FIG. 3 schematically illustrates an alternative embodiment of a power control integrated circuit having a header voltage switching device, in which both a retention switching device and a voltage level shifter connecting the voltage switching device to the overdrive voltage supply are implemented as half latches.

FIG. 3 schematically illustrates a third embodiment of the present invention, in which a header voltage switching device is provided comprising a PFET transistor 330 and an NFET transistor 320 coupled to a voltage supply input Vin and switchably coupled to a voltage supply output Vout. In this third embodiment, instead of providing inverters as the voltage level switching devices to couple the voltage switching device 320, 330 both to an overdrive voltage Vod and to a voltage supply input Vin, a first half latch circuit 332 and second half latch 302 are provided. The first half latch circuit 332 couples the voltage switching device to the overdrive voltage under the control of the power control input signal (SLEEPN) whilst the second half latch circuit 302 is provided in place of the second inverter 102 of FIG. 1A to connect the retention switching device 320 to the overdriven voltage Vod under control of the retention enable signal (RETN).

It will be appreciated that a similar arrangement can be provided analogous to the footer voltage switching device of FIG. 2A with the first inverter 232 replaced by a first half latch and a second inverter 202 replaced by a second half latch circuit similarly to the arrangement of FIG. 3. In the case of level shifting inverters an extra leakage term is introduced by under-driving their inputs relative to their supply Vod, thus preventing the pullup PFETs from ever turning fully off. The feedback and pass transistors in the half latches (top-most two PFETs labelled P4 & P5 in the schematic and outermost NFETs N3 & N5) ensure that the input to the pullup PFET is connected to Vod and therefore can be turned fully off.

Figure 4A:
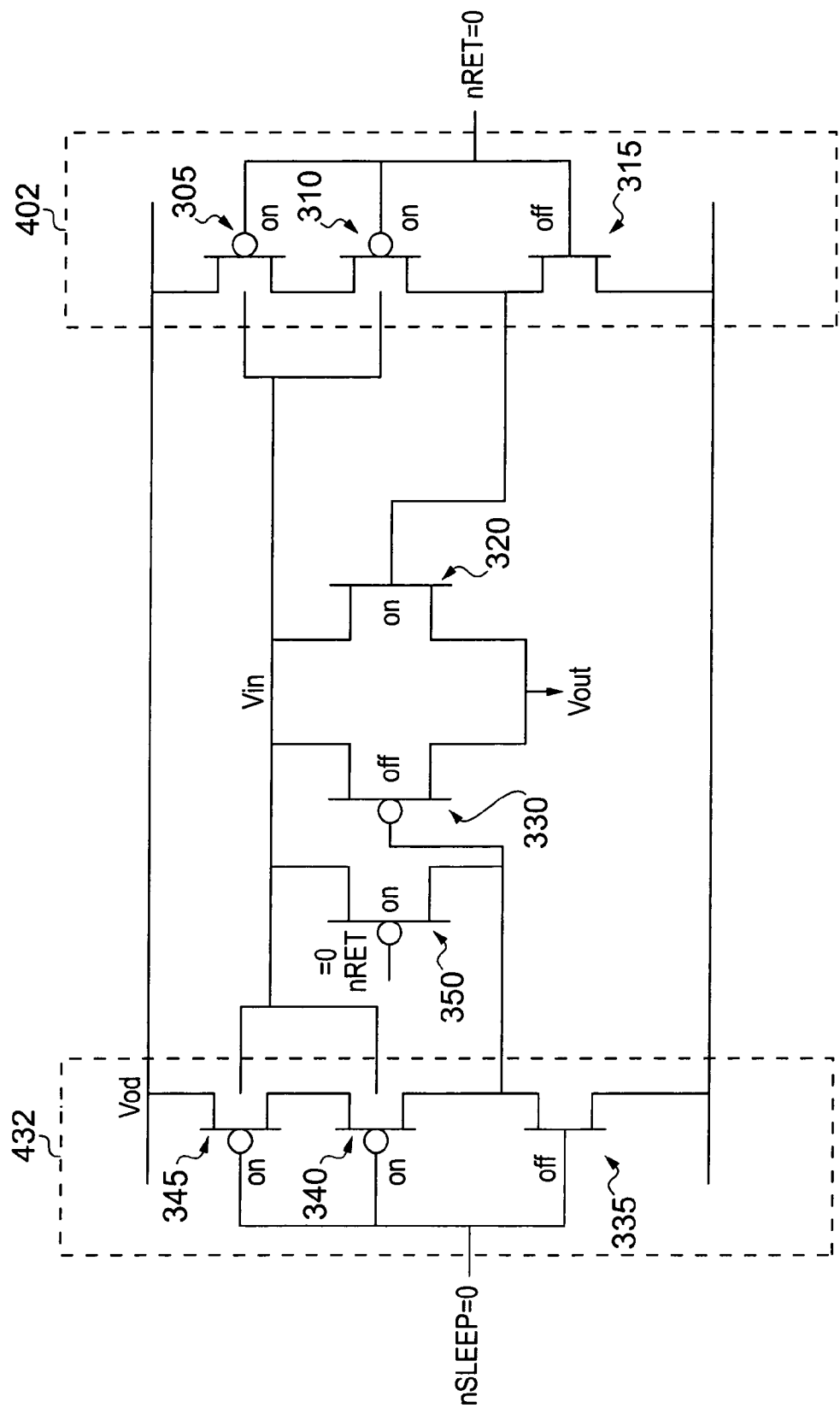
FIG. 4A schematically illustrates a header voltage switching device having retention switching device connected to the overdrive voltage supply and further comprising an inrush current limitation circuitry, the illustrated circuit being in a retention mode.
Figure 4B:
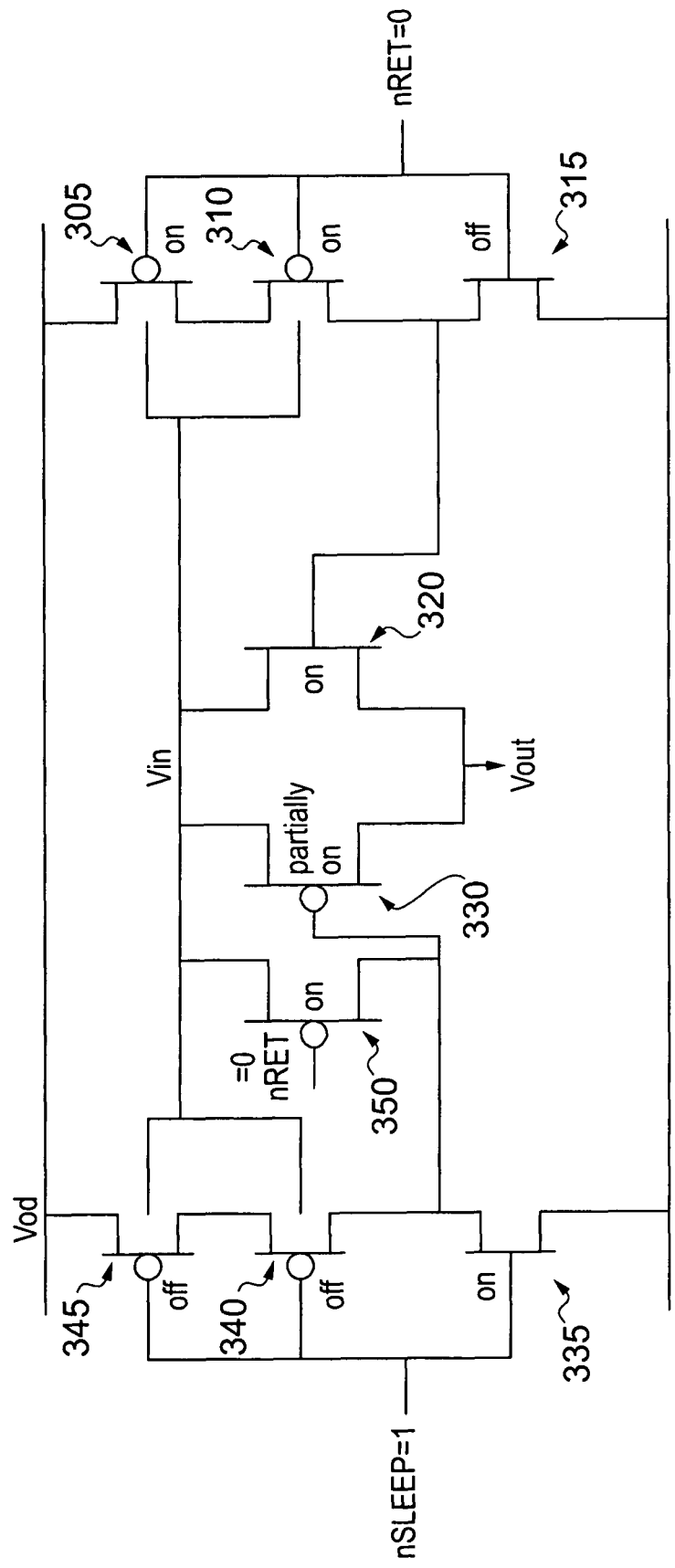
FIG. 4B schematically illustrates a power control integrated circuit of FIG. 4A but with the circuit in an inrush limitation configuration rather than the retention mode.

FIG. 4A schematically illustrates a power control integrated circuit comprising a header voltage switching device and incorporating inrush current limitation circuitry. FIG. 4A shows this inrush limitation power control circuitry in a retention mode whilst FIG. 4B shows this same circuitry in a full power on configuration. The arrangement of circuitry in FIG. 4A is very similar to the arrangement of circuitry in FIG. 1A, but in the case of FIG. 4A an extra PFET 350 is provided between the input voltage supply rail Vin and a gate of the PFET 330 of the header voltage switching device. This PFET device 350 serves as inrush current limitation circuitry and is controlled by the retention enable signal nRET, which also controls the second inverter 402.

The second inverter 402 is a retention switching device and comprising PFET transistors 305, 310 and NFET transistors 315 and it functions together with the inrush current limitation PFET 350 to provide a reduced voltage suitable for maintaining storage devices coupled to the Vout signal in a retention state. Similarly to the circuit of FIG. 1A, the stacked PFET devices 305, 310, 340, 345 of the FIG. 4A circuit are biased with the voltage supply input voltage Vin, which is lower than the overdrive voltage. The stacking of transistors provides a decreased leakage characteristic when the device is turned off.

In the configuration of FIG. 4A nSLEEP=0, nRET=0 and the header circuit is in a retention mode. In this state, the two PFETs 340, 345 of the first inverter 432 are switched on, whilst the NFET 335 of the first inverter is switched off. This results in the PFET 330 of the header voltage switching device being coupled to the overdrive voltage and thus overdriven to the off state. In the second inverter, because nRET=0, the stacked PFETs 305, 310 are both switched on whilst the NFET 315 of the second inverter 402 is switched off. This results in the NFET 320 of the header voltage switching device being coupled to the overdrive voltage Vod and thus switched on. Since the PFET 350 serving to limit inrush current is controlled by the retention enable signal nRET which has a value of logical zero, this transistor is switched on. The state of circuit elements other than the inrush limitation PFET 350 are identical to the corresponding circuit elements of FIG. 1C (retention mode).

Figure 4C:
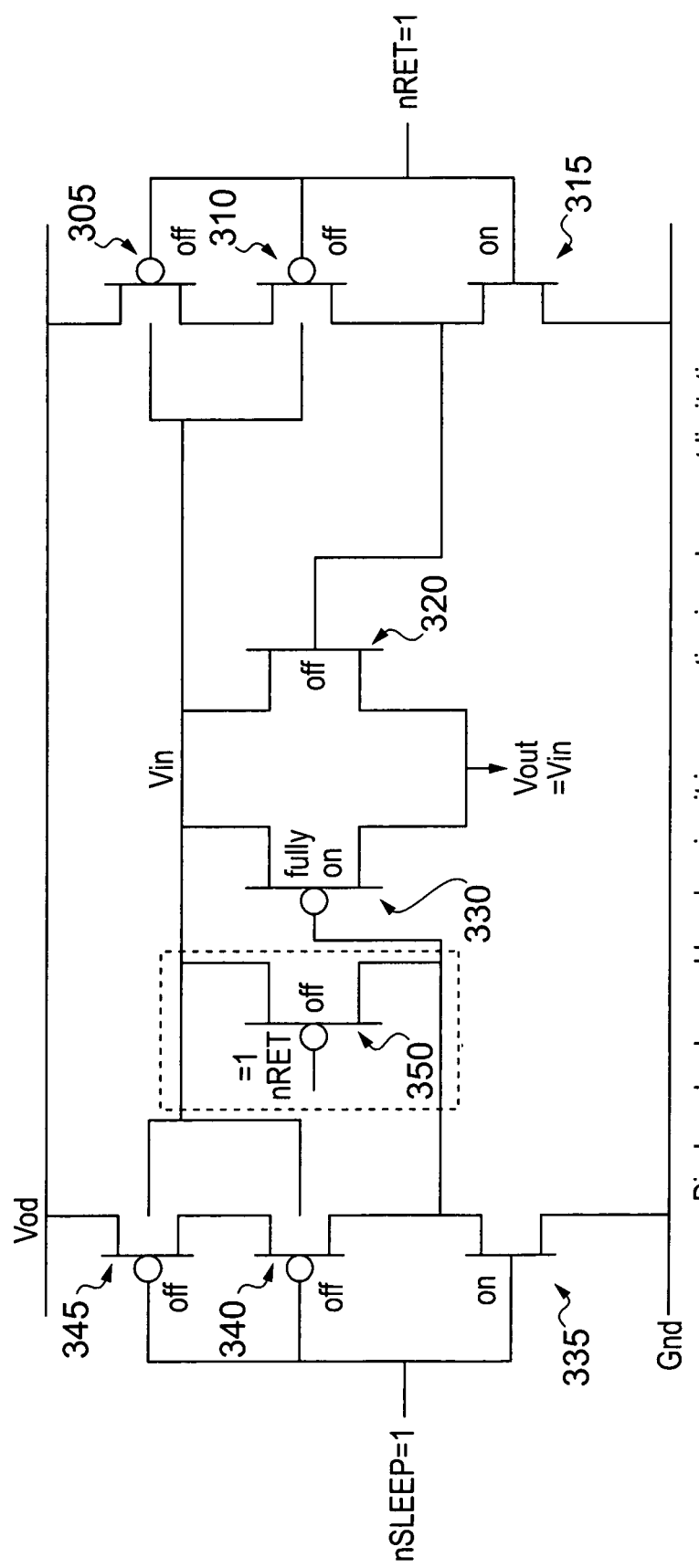
FIG. 4C schematically illustrates a power control integrated circuit of FIG. 4A but with the circuit in a full power on configuration.

FIG. 4C schematically illustrates what happens when the circuit of FIG. 4A is in a full power-on configuration where nSLEEP=1 and nRET=1. The transistors of the first inverter 432 switch polarity relative to the corresponding transistors of FIG. 4A such that the PFETs 340, 345 are both switched off and the NFET 335 is switched on. In the second inverter 402, the pair of stacked PFETs 305, 310 are both switched off, whilst the NFET 315 is switched on. This results in the NFET 320 of the header voltage switching device being coupled to ground via the NFET 315 and thus switching off. The PFET 330 of the header voltage switching device is coupled to ground via the NFET 335 of the first inverter 432, and thus is in an on configuration. The states of circuit elements other than inrush limitation PFET 350 in FIG. 4C are identical to the states of corresponding circuit elements of FIG. 1A (power on).

However, for the circuit of FIGS. 4A-4C, an additional mode of operation is provided in addition to the power on mode, power off mode and retention mode of FIGS. 1A-C. In particular an inrush limitation mode is provided and the circuit is placed in this inrush limitation mode as an intermediate mode between the retention mode of FIG. 4A (nSLEEP=0, NRET=0) and the full power on mode of FIG. 4C (nSLEEP=1, nRET=1). This inrush limitation mode is schematically illustrated in FIG. 4B. In this inrush limitation mode nSLEEP=1 and nRET=0. This input signal combination corresponds to a mode that was unused in the circuits of FIGS. 1A to 1C. In this inrush current limitation mode, NFET 335 is on, PFETS 340, 345 are off so inrush limitation PFET 350 is on and the header switching device 330 is only partially on. Since nRET=0, the retention device 320 is still on and the PFETS 302, 310 of the second inverter 402 are still on, but NFET 315 of the second inverter is off as in FIG. 4A. However, when the circuit transitions from the inrush current limitation mode of FIG. 4B to the full power on mode of FIG. 4C, nRET transitions from 0 to 1 so that inrush limitation PFET 350 switches off.

In the absence of the PFET 350 and when there is no inrush limitation mode, when a transition is made from the retention mode of FIG. 4A directly to the power on mode of FIG. 4C, there is an inrush of current as the PFET device 330 of the header voltage switching device switches from off to on, i.e. it begins to conduct a greater current flow. This inrush of current has the potential to cause a drop in voltage across the voltage supply input Vin.

Without the presence of the PFET 350, this drop in voltage could potentially cause logic elements (not shown) connected to the Vout signal, which were in a retention mode prior to the transition of the nSLEEP and nRET to lose the contents of data held in the retention latch.

However, the provision of the PFET device 350 reduces the chances of the data held in the retention latch being lost because an additional mode (i.e. the inrush mode of FIG. 4B) is provided between the retention mode and the power on mode in order to delay the transition of the nRET signal (from 0 to 1) until after the transition of the nSLEEP signal (from 0 to 1) so that the gate voltage seen by the PFET device 330 of the header voltage switching device is higher than that of the NFET device 335 of the first inverter 432 alone. This causes the PFET device 330 to be only partially in the on state (in the inrush limitation mode) and thus to source a lower amount of current to the Vout pin. The voltage on the gate of the PFET device 330 of the voltage switching device can be selected by appropriate sizing of the inrush current limitation PFET 350 and thus the amount of current sourced by the PFET device 330 can be reduced as desired by the circuit designer and arranged to ensure that inrush current does not cause data to be lost in the retention state of the device.

The nRET retention enable signal would remain at a logic value of zero until any drop in the voltage source Vin has been restored after the inrush current has diminished and the circuit is stable (i.e. the circuit is retained in the inrush mode of FIG. 4B). After this time, the nRET signal transitions to a logic value of one corresponding to the full power on configuration and causing the PFET device 350 to turn off as shown in FIG. 4C and the PFET device 330 to enter a fully on state.

It will be appreciated that a similar modifications to those made in to the circuits of FIGS. 1A-C to provide the circuit of FIGS. 4A-C can be made to the footer voltage switching device of FIGS. 2A-C by the addition of an NFET device coupling the "Vssin" voltage source to the "Vssout" output signal and controlled by the RET retention enable signal.

Figure 5:
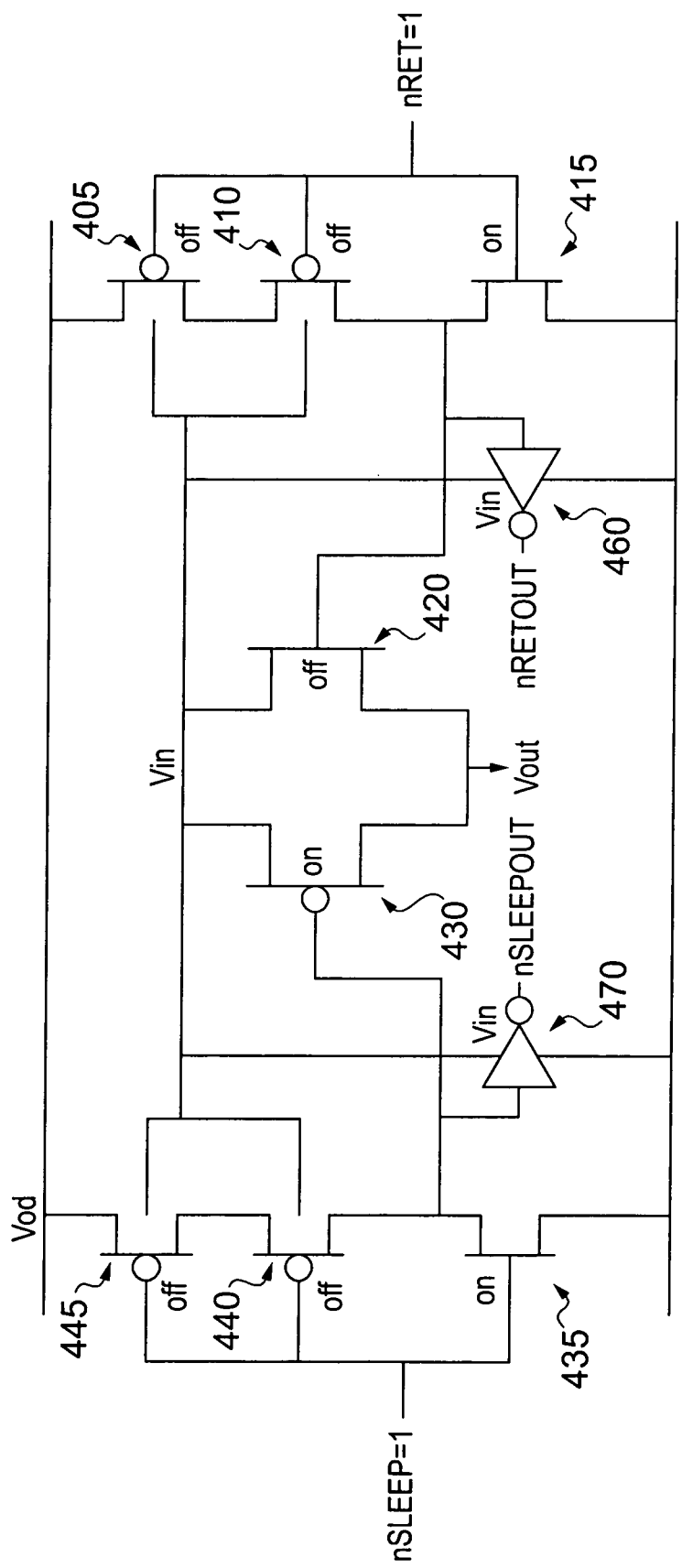
FIG. 5 schematically illustrates a power control integrated circuit comprising a header voltage switching device similar to the circuit of FIG. 1A, but in which buffering elements are supplied for both the power control input signal and the retention enable signal.

FIG. 5 schematically illustrates a further embodiment of the present invention similar to the embodiment of the header voltage switching device of FIG. 1A, but in which a pair of inverters 460, 470 has been added to the circuit. The inverter 470 serves to buffer the output of the nSLEEP signal (i.e. to buffer the control output signal), whilst the inverter 460 serves to buffer the nRET (i.e. the retention enable signal). The inverter 470 that buffers the nSLEEP signal is coupled to the output of the nSLEEP inverter composed of the NFET device 435 and the pair of stacked PFET devices 440, 445. The buffer for the nRET signal i.e. the inverter 460 is coupled to the output of the nRET inverter composed of the pair of stacked PFETs 405, 410 and the NFET 415.

The first inverter produces an output signal "nSLEEPOUT", which is a buffered version of nSLEEP whereas the inverter 460 provides an output of "nRETOUT" corresponding to a buffered version of the retention enable signal nRET. Both of these inverters 460, 470 are powered by the voltage supply input Vin. When each of the inverters 460, 470 is driven by a logic one input then it will be overdriven in the same manner as: (i) the PFET device 430 in the case of the inverter 470; and (ii) the NFET device 420 in the case of the inverter 460. This results in a reduced leakage current. The output of the inverter 470 may be supplied as input to the nSLEEP of a further power control integrated cell (not shown) whilst the output of the inverter 460 may be supplied as input to the nSLEEP input of a power control integrated circuit cell of a similar type to those shown in FIG. 1A and FIG. 4 and to drive others of the same circuit types.

It will be appreciated that a similar modification can be made to the enhanced footer voltage switching device of FIG. 2A by adding buffering inverters and a similar modification can also be made to the header cell described above in relation to the embodiment of FIG. 3 having the inrush current limitation PFET 350.

In the circuit of FIG. 5, the buffer 470 controlled by the nSLEEP power control input signal is responsive to the power supply output Vout, whose value is determined by the state of the PFET 430 and the NFET 420 of the voltage switching device (header device). Similarly the buffer 460 that is coupled to the nRET retention enable signal input is responsive to the power supply output Vout of the voltage switching device 420, 430. The inverters 460, 470 of FIG. 5 perform a similar function to the power control signal buffer circuit 16, 18 of FIG. 3 of the earlier U.S. patent application Ser. No. 11/920,364, of which this application is a Continuation-in-Part. In the terminology of that earlier application, the voltage rail Vin in FIG. 5 of the present application can be considered to be a counterpart of the "unswitched power supply input" whilst Vout of the present application can be considered to be a counterpart of the "switched power supply output" of the present application. The power control input signals nSLEEP of FIG. 5 of the present application is analogous to the power control signal input NStartIn in FIG. 3 of U.S. Ser. No. 11/920,364. In a similar way to the above mentioned earlier application, the inverter 470 of FIG. 5 of the present application that performs the buffering of the power control input signal nSLEEP is at least partially powered from the unswitched power supply input Vin and is responsive to the switched power supply output Vout to drive a power control output signal nSLEEPOUT from a power control signal output. In a similar way, the inverter 460 of the present application is at least partially powered from the unswitched power supply Vin and is responsive to the switched power supply output Vout to drive a power control output signal nRETOUT from a power control signal output.

Provision within an integrated circuit cell of Vin, Vout, Vod and the two inverters 460, 470 of FIG. 5 of the present application makes use of the physical proximity of the unswitched power supply line Vin around both of the inverters 460, 470 that perform the buffering function to conveniently derive their permanently live power supply from Vin as required. By arranging the inverters 460, 470 to be responsive to the switched power supply output Vout to drive the buffered output signal nSLEEPOUT and nRETOUT from the corresponding power control sign outputs, a significant delay can be introduced between the power control input signal nSLEEP and the retention enable input signal nRET. This causes the power switching circuit to connect the switched power supply output to the unswitched power supply input and the power control signal buffering circuitry 470 and the retention enable signal buffering circuitry 460 propagates the relevant control signal as the output power control signal. Thus, when an individual standard cell comprising the circuit components of FIG. 5 is connected with other power controlling integrated circuit cells, this can significantly reduce peak current and hence reduce power surges.

Figure 6:
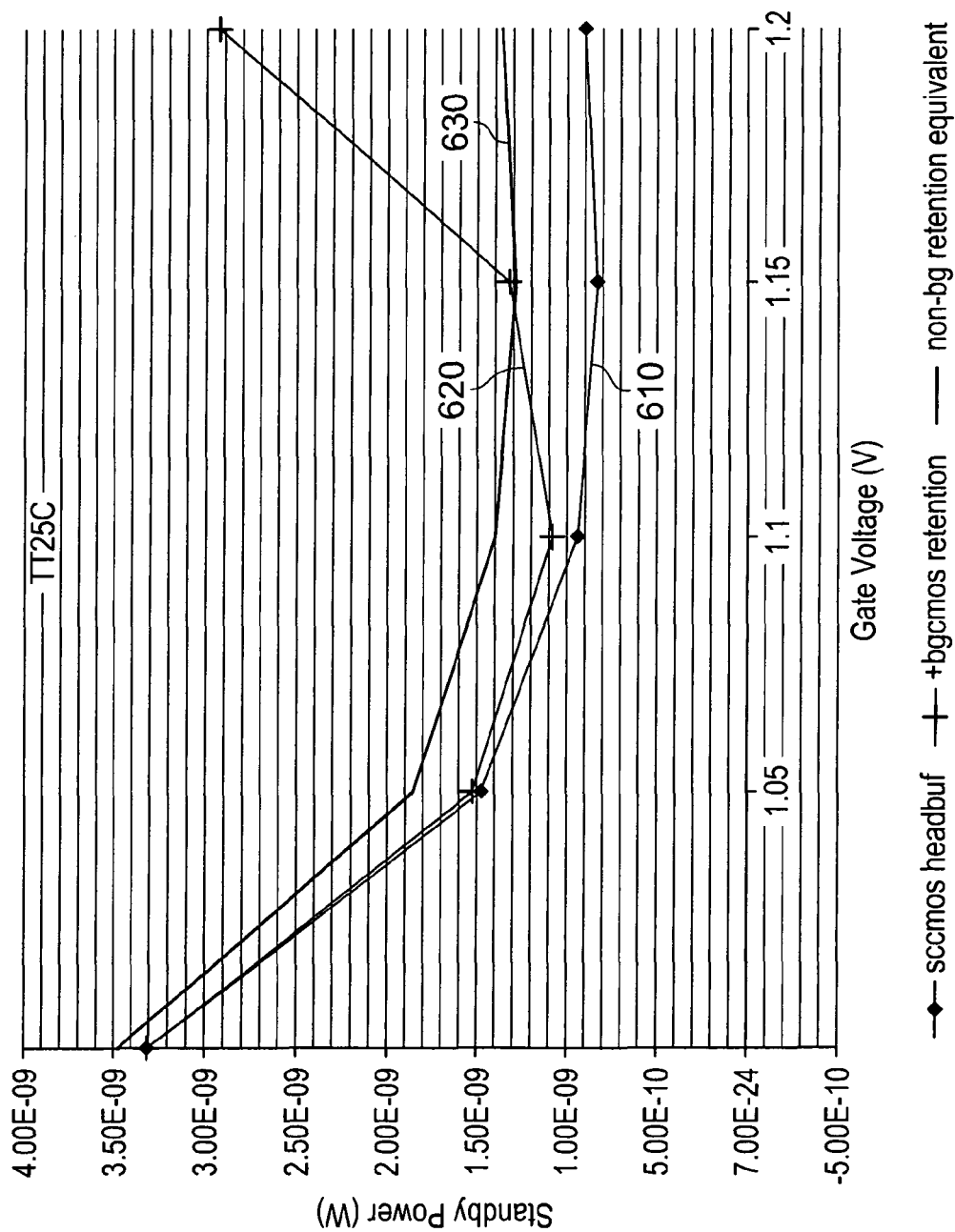
FIG. 6 is a graph that schematically illustrates standby power in Watts against gate voltage in Volts for three different example power controlling circuit configurations.

FIG. 6 is a graph that schematically illustrates the standby power in Watts against gate voltage in Volts for three different variants of a power control integrated circuit. The results presented in the graph of FIG. 6 were obtained via computer simulation of circuit operation. The simulation temperature corresponds to 25 degrees Centigrade for the purposes of this simulation. In the graph of FIG. 6, a first line 610 having diamond-shaped data points corresponds to a header or footer voltage switching device in which no retention device is provided, but an inverter analogous to the inverter 132 of FIG. 1A is provided to connect the voltage switching device to an overdriven voltage in addition to connecting it to the standard voltage input supply Vin. In other words, the line 610 corresponds to a circuit having a super cut-off on the power gate i.e. the voltage switching device but no retention device.

A second line 620 having crosses as data points corresponds to a circuit having both a retention device and a voltage switching device connected to the overdrive supply voltage, similarly to the circuit of FIG. 1A.

A third line 630 corresponds to a circuit in which the voltage switching device is overdriven similarly to the line 610, but instead of there being no retention device at all, the overdriven retention device corresponding to the inverter 102 of FIG. 1A has been replaced by a large regular NFET of equivalent drive strength. This does not correspond exactly to any of the circuits of FIGS. 1A to 5 described above as it corresponds to a previously known technique against which the present technique was compared.

The graph of FIG. 6 shows that the improvement in terms of reduced consumption of standby power is excellent for the line 610 up to a gate voltage of around 1.1 Volts where the graph line flattens off due to additional leakage through the input inverter. Comparison of the lines 610 and 620 shows that the power overhead of adding the retention device (included in the circuit corresponding to line 620) is negligible below 1.1 Volts, after which the forward-biased leakage becomes more significant.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

Other illustrative aspects and features of the present technique are described in the following text:

Disclosed is a first circuit for enhanced power gating with reduced leakage when in a low power mode and in a retention mode. In the disclosed circuit a header power cell is augmented with an input inverter controlled by an enable signal and powered by a higher supply voltage, powering the gate input to the inverter controlling the coupling of the Vin supply voltage to the Vout signal to a higher voltage, providing a reduction in leakage current when the circuit is driven into low power mode. In a similar fashion, the disclosed circuit may include a second inverter controlled by a second enable signal and powered by the higher voltage, providing a reduction in leakage current when the circuit is configured to source a reduced voltage on the Vout signal to maintain connected logic circuits in a retention mode.

FIG. 1A shows the disclosed circuit with the addition of the second inverter composed of NFET device 115 and PFET devices 105 and 110 coupled to the nRET signal enabling. This inverter and NFET 120 functions to provide a reduced voltage suitable for maintaining storage devices coupled to the Vout signal in a retention state.

In the disclosed circuit the stacked PFET devices 105, 110, 140, and 145 are biased with the lower Vin voltage to reduce cell area. The use of stacked PFETs (145 and 140, and 105 and 110) mitigates the associated leakage characteristic when the device is turned off.

When the nSLEEP input signal is a logic one and the nRET input signal is a logic one, the PFET device 130 coupling the Vin input voltage source to the Vout is turned on and the output Vout will be effectively the Vin voltage. The NFET device 120 coupling the Vin voltage source to the Vout output is turned off. In this mode the logic devices powered by the Vout signal are in a full power on mode.

When the nSLEEP input signal is a logic zero and the nRET input signal is a logic one, both the PFET device 130 coupling the Vin input voltage to the Vout signal is turned off and the NFET device 120 coupling the Vin voltage to the Vout signal is turned off, resulting in the output signal Vout no longer coupling the Vin input voltage to the Vout signal. The first inverter, composed of PFET devices 140 and 145 and NFET device 135, driven by the nSLEEP signal, drives the gate of the PFET device 130 to an input voltage higher than that of Vin, effectively overdriving the PFET device 130 to an off state and significantly reducing the leakage current from the leakage current which would exist if the PFET device 130 were driven off by an input signal at the voltage level of Vin. In this mode the output on the Vout signal is effectively floating and sourcing no current other than leakage current, and the logic powered by the Vout signal is in a power off mode.

When the nSLEEP input signal is a logic one and the nRET input signal is a logic zero, the PFET device 130 coupling the Vin input voltage source to the Vout signal is turned on, and the NFET device 120 coupling the Vin voltage source to the Vout signal is turned on, and the Vin voltage source is coupled to the Vout signal by both the PFET device 130 and the NFET device 120. The mode is inefficient and is not typically used.

When the nSLEEP input signal is a logic zero and the nRET input signal is a logic zero the PFET device 130 is turned off and overdriven as described above. The PFET device 130 is no longer coupling the Vin source voltage to the Vout signal. The NFET device 120 is turned on and coupling the Vin voltage source to the Vout output signal at a level at least sufficient to maintain the logic devices powered by the Vout signal to be maintained in a retention mode.

Disclosed is a second circuit for enhanced power gating with reduced leakage when in a low power mode and in a retention mode. In the disclosed circuit a footer cell is augmented with an input inverter controlled by an enable signal and powered by a supply voltage, Vssod, lower than the ground supply, Vssin. In a similar fashion, the disclosed circuit may include a second inverter controlled by a second enable signal and powered by the lower voltage, providing a reduction in leakage current when the circuit is configured to provide a ground connection at a voltage level slightly above the Vssin voltage level to maintain connected logic circuits in a retention mode.

FIG. 2A shows the disclosed circuit with the addition of the second inverter composed of NFET devices 210 and 215 and PFET device 205 coupled to the RET signal enabling. This inverter and PFET 220 functions to provide a higher voltage on the ground source suitable for maintaining storage devices coupled to the Vssout signal in a retention state.

In the disclosed circuit the stacked NFET devices 210, 215, 240, and 245 are biased with the higher Vssin voltage to enable a decreased leakage characteristic when the device is turned off. Input voltage source 225 is driven to a positive voltage. The lower voltage on the Vssod voltage source applied to the gate of NFET device 230 enables the NFET device 230 coupling the Vssin ground supply to the Vssout signal to be over driven to an off state characterized by lower leakage current compared to the same device with the voltage level of the Vssin voltage source.

When the SLEEP input signal is a logic zero and the RET input signal is a logic zero, the NFET device 230 coupling the Vssin input voltage source to the Vssout signal is turned on and the output Vssout signal will be effectively at the Vssin voltage level, a level slightly above ground. The PFET device 220 coupling the Vssin voltage source to the Vssout output is turned off. In this mode the logic coupled to the Vssout signal are effectively connected to ground and operating in a full power on mode.

When the SLEEP input signal is a logic one and the RET input signal is a logic zero, both the NFET device 230 coupling the Vssin input to the Vout is turned off and the PFET device 220 coupling Vin to Vout is turned off, resulting in the output signal Vout no longer coupling the Vssin input voltage to the Vssout signal. The first inverter, composed of NFET devices 240 and 245 and PFET device 235, driven by the SLEEP signal, drives the gate of the NFET device 230 to an input voltage lower than that of Vssin, effectively overdriving the NFET device 230 to an off state and significantly reducing the leakage current from the leakage current which would exist if the NFET device 230 were driven off by an input signal at the voltage level of Vssin. In this mode the output on the Vssout signal is effectively floating and sinking no current other than leakage current, and the logic powered by the Vssout signal is in a power off mode.

When the SLEEP input signal is a logic zero and the RET input signal is a logic one, the NFET device 230 coupling the Vssin input voltage source to the Vssout signal is turned on, and the PFET device 220 coupling the Vssin voltage source to the Vssout signal is turned on, and the Vssin voltage source is coupled to the Vssout signal by both the NFET device 230 and the PFET device 220. The mode is inefficient and is not typically used.

When the SLEEP input signal is a logic one and the RET input signal is a logic one the NFET device 230 is turned off and overdriven as described above. The NFET device 230 is no longer coupling the Vssin source voltage to the Vssout signal. The PFET device 220 is turned on and coupling the Vssin voltage source to the Vssout output signal at a level at least sufficient to maintain the logic devices effectively coupled to ground by the Vssout signal to be maintained in a retention mode.

Disclosed is a third circuit for enhanced power gating with reduced leakage when in a low power mode and in a retention mode. In the disclosed circuit a header power cell is augmented with an input inverter controlled by an enable signal and powered by a higher supply voltage, powering the gate input to the inverter controlling the coupling of the Vin supply voltage to the Vout signal to a higher voltage, providing a reduction in leakage current when the circuit is driven into low power mode. In a similar fashion, the disclosed circuit may include a second inverter controlled by a second enable signal and powered by the higher voltage, providing a reduction in leakage current when the circuit is configured to source a reduced voltage on the Vout signal to maintain connected logic circuits in a retention mode. Further, a PFET device 350 is coupled between the Vin voltage source and the gate to the PFET device 330 and controlled by the nRET input signal.

FIG. 4A shows the disclosed circuit with the addition of the second inverter composed of NFET device 315 and PFET devices 305 and 310 coupled to the nRET signal enabling. This inverter and NFET 320 functions to provide a reduced voltage suitable for maintaining storage devices coupled to the Vout signal in a retention state.

In the disclosed circuit the stacked PFET devices 305, 310, 340, and 345 are biased with the lower Vin voltage to enable a decreased leakage characteristic when the device is turned off.

In the disclosed circuit the circuit discussed above and shown in one embodiment in FIG. 1A is augmented with a PFET device 350 controlled by the nRET input signal. When the nRET input signal is a logic zero and the nSLEEP signal is a logic zero the disclosed header circuit is in retention mode. When the circuit is transitioned from retention mode to a full power on mode it is possible to see an inrush of current as the PFET device 330 in this and other similar header cells begin to conduct a greater current flow. This inrush of current has the potential to cause a drop in voltage on the Vin voltage source. This drop in voltage may cause logic elements connected to the Vout signal, which were in retention mode prior to the transition of nSLEEP and nRET, to lose the contents of the data held in the retention latch. This condition may be avoided by the introduction of PFET device 350 coupled between the Vin voltage source and the gate of PFET device 330. By delaying the transition of the nRET signal after the transition of the nSLEEP signal the gate voltage seen by PFET device 330 is higher than that of NFET device 335 alone, causing the PFET device 330 to be only partially in the on state and sourcing a lower amount of current to the Vout pin. The voltage on the gate of PFET device 330 is selected by the sizing of PFET device 350 and therefore the amount of current sourced by PFET device 330 may be reduced as desired by the circuit designer as needed to ensure the inrush current does not cause deleterious behavior. The nRET signal would remain at a logic zero until any drop on the voltage source Vin has been restored after the inrush current has diminished and the circuit is stable. After this time the nRET signal would transition to a logic one, causing the PFET device 350 to turn off and PFET device 330 to enter a fully on state.

A similar modification of the addition of a PFET device as shown in FIG. 4A may be made to the enhanced footer cell described in respect of FIG. 2A by the addition of an NFET device coupling the Vssin voltage source to the Vssout output signal and controlled by the RET input signal.

Disclosed is a fourth circuit for enhanced power gating with reduced leakage when in a low power mode and in a retention mode. In the disclosed circuit a header power cell is augmented with an input inverter controlled by an enable signal and powered by a higher supply voltage, powering the gate input to the inverter controlling the coupling of the Vin supply voltage to the Vout signal to a higher voltage, providing a reduction in leakage current when the circuit is driven into low power mode. In a similar fashion, the disclosed circuit may include a second inverter controlled by a second enable signal and powered by the higher voltage, providing a reduction in leakage current when the circuit is configured to source a reduced voltage on the Vout signal to maintain connected logic circuits in a retention mode. Further, an inverter is added to the output of each of the two inverters coupled to the nSLEEP and nRET input signals.

FIG. 5 shows the disclosed circuit with the addition of the second inverter composed of NFET device 415 and PFET devices 405 and 410 coupled to the nRET signal enabling. This inverter and NFET 420 functions to provide a reduced voltage suitable for maintaining storage devices coupled to the Vout signal in a retention state.

In the disclosed circuit the circuit discussed above and shown in one embodiment in FIG. 1A is augmented with an inverter 470 coupled to the output of the nSLEEP inverter composed of NFET device 435 and PFET devices 440 and 445, and further augmented with an inverter 460 coupled to the output of the nRET inverter composed of NFET device 415 and PFET devices 405 and 410. The two additional inverters 470 and 460 buffer the input signals nSLEEP and nRET, respectively, producing output signals nSLEEPOUT and nRETOUT, respectively. The inverters 470 and 460 are powered by the voltage source Vin. When these inverters are driven by a logic one input the inverters will be overdriven in the same manner as the PFET device 430 and the NFET device 420, resulting in a reduced leakage current.

These signals may be driven to the nSLEEP and nRET inputs of header cells of the type shown in FIGS. 1 and 3 above, and to drive other of the same circuit.

A similar modification may be made to the enhanced footer cell described in respect of FIG. 2A, and the enhanced header cell described in respect of FIG. 4A.

We claim:

1. A power control integrated circuit cell comprising:
a voltage switching device having a voltage supply input and a voltage supply output and wherein said voltage supply output is switchably coupled to said voltage supply input in response to a power control input signal such that in a power on configuration of said voltage switching device said voltage supply output is coupled to said voltage supply input;
a retention switching device coupled to said voltage switching device and configured to switchably couple said voltage supply output said voltage supply input in response to a retention enable signal such that in a retention enabled configuration of said retention switching device said voltage supply output corresponds to a retention voltage reduced relative to said voltage supply input;
wherein said retention switching device has a further voltage input from an overdrive voltage supply such that in said retention enabled configuration, said retention switching device is switched on more strongly relative to being both coupled to said voltage supply input signal and driven from said voltage supply input signal and wherein in a power off configuration of said voltage switching device said voltage supply output is determined by said retention switching device.

2. A power control integrated circuit cell as claimed in claim 1, wherein said voltage switching device is a header switching device in which said input supply voltage corresponds to a positive supply voltage and wherein said overdrive voltage supply is greater than said voltage supply input.

3. A power control integrated circuit cell as claimed in claim 1, wherein said voltage switching device is a footer switching device in which said input supply voltage corresponds to a ground voltage level and wherein said overdrive voltage supply is less than said voltage supply input.

4. A power control integrated circuit cell as claimed in claim 1, wherein said voltage switching device has an overdrive input for coupling said voltage switching device to said overdrive voltage supply when one of: (i) said voltage switching device is in said power off configuration and said retention switching device is configured such that said voltage supply output is decoupled from said voltage supply input; and (ii) said voltage switching device is in said power off configuration and said retention switching device is configured such that said voltage supply output is coupled to said voltage supply input via said retention switching device.

5. A power control integrated circuit cell as claimed in claim 4, wherein said voltage switching device is coupled to said overdrive voltage supply via a first voltage level shifter and wherein said first voltage level shifter is controlled by said power control input signal.

6. A power control integrated circuit cell as claimed in claim 5, wherein said first voltage level shifter comprises a first inverter.

7. A power control integrated circuit cell as claimed in claim 6, wherein said inverter comprises a pair of stacked transistors biased by said input supply voltage.

8. A power control integrated circuit cell as claimed in claim 5, wherein said first voltage level shifter comprises a half latch.

9. Power control integrated circuit cell as claimed in claim 5, comprising a first buffering circuit element coupled to an output of said first voltage level shifter and configured to buffer said power control input signal.

10. Power control integrated circuit cell as claimed in claim 9, wherein said first buffering circuit element is powered by said voltage supply input.

11. A power control integrated circuit cell as claimed in claim 1, wherein said voltage supply input is a substantially fixed input voltage and wherein said overdrive voltage supply is configured such that an overdrive voltage is selectable from a range comprising a plurality of overdrive voltages.

12. A power control integrated circuit cell as claimed in claim 1, wherein said retention switching device is coupled to said overdrive voltage supply via a second voltage level shifter and wherein said second voltage level shifter is controlled by said retention enable signal.

13. A power control integrated circuit cell as claimed in claim 12, wherein said second voltage level shifter comprises a second inverter.

14. A power control integrated circuit cell as claimed in claim 13, wherein said second inverter comprises a pair of stacked transistors biased with said input supply voltage.

15. A power control integrated circuit cell as claimed in claim 12, wherein said second voltage level shifter comprises a half-latch.

16. Power control integrated circuit cell as claimed in claim 12, comprising a second buffering circuit element coupled to an output of said second voltage level shifter and configured to buffer said retention enable signal.

17. Power control integrated circuit cell as claimed in claim 16, wherein said second buffering circuit element is powered by said voltage supply input.

18. A power control integrated circuit cell as claimed in claim 1, wherein at least one of said voltage switching device and said retention switching device comprises a field effect transistor.

19. A power control integrated circuit cell as claimed in claim 1, comprising an inrush protection switching device controlled by said retention enable signal and configured to resist an inrush of current when said power control integrated circuit switched from a retention mode to a power on mode.

20. A power control integrated circuit cell as claimed in claim 19, wherein said inrush protection switching device is coupled between said voltage supply input and an input of said voltage switching device.

21. Power control integrated circuit cell as claimed in claim 20, wherein said voltage switching device comprises a field effect transistor and said input of said voltage switching device comprises a gate of said voltage switching device.

22. Power control integrated circuit cell as claimed in claim 21, wherein said inrush protection switching device comprises a field effect transistor of a type matching said voltage switching device field effect transistor, said type being one of PFET and NFET.

23. Power control integrated circuit cell as claimed in claim 22 wherein electrical characteristics of said inrush protection switching device are balanced against electrical characteristics of said voltage switching device to effect said resistance to said inrush of current.

24. A power controlling integrated circuit cell comprising:
  a retention switching device having voltage supply input and a voltage supply output and wherein said voltage supply output is switchably coupled to said voltage supply input in response to a retention enable signal such that when said coupling is enabled said voltage supply output corresponds to a retention voltage reduced relative to said voltage supply input;
  wherein said retention switching device has an input from an overdriven voltage supply such that when said retention switching device is enabled it is switched on more strongly relative to being both coupled to said voltage supply input signal and driven from said voltage supply input signal.

25. A non-transitory computer-readable storage medium storing a data structure comprising a standard cell circuit definition for use for controlling a computer to generate and validate a circuit layout of a circuit cell of an integrated circuit, said circuit cell comprising:
  a voltage switching device having a voltage supply input and a voltage supply output and wherein said voltage supply output is switchably coupled to said voltage supply input in response to a power control input signal such that in a power on configuration of said voltage switching device said voltage supply output is coupled to said voltage supply input;
  a retention switching device coupled to said voltage switching device and configured to switchably couple said voltage supply output to said voltage supply input in response to a retention enable signal such that in a retention enabled configuration of said retention switching device said voltage supply output corresponds to a retention voltage reduced relative to said voltage supply input;
  wherein said retention switching device has a further voltage input from an overdrive voltage supply such that in said retention enabled configuration, said retention switching device is switched on more strongly relative to being both coupled to said voltage supply input signal and driven from said voltage supply input signal and wherein in a power off configuration of said voltage switching device said voltage supply output is determined by said retention switching device.

26. A non-transitory computer-readable storage medium storing a data structure comprising a standard cell circuit definition for controlling a computer to generate and validate a circuit layout of a circuit cell of an integrated circuit, said circuit cell comprising:
  a retention switching device having voltage supply input and a voltage supply output and wherein said voltage supply output is switchably coupled to said voltage supply input in response to a retention enable signal such that when said coupling is enabled said voltage supply output corresponds to a retention voltage reduced relative to said voltage supply input;
  wherein said retention switching device has an input from an overdriven voltage supply such that when said retention switching device is enabled it is switched on more strongly relative to being both coupled to said voltage supply input signal and driven from said voltage supply input signal.

27. A non-transitory computer-readable storage medium storing a data structure comprising a standard cell circuit definition for controlling a computer to generate and validate a circuit layout of a circuit cell of an integrated circuit, said circuit cell comprising:
  a voltage switching device having a voltage supply input and a voltage supply output and wherein said power supply output is switchably coupled to said voltage supply input in response to a power control input signal such that in a power on configuration of said voltage switching device said voltage supply output is coupled to said voltage supply input;
  wherein said voltage switching device has a further voltage input from a overdrive voltage supply such that when said voltage switching device is in a power off configuration in which said voltage supply output is decoupled from said voltage supply input, said voltage switching device is switched off more strongly relative to said voltage switching device being both coupled to said voltage supply input signal and driven from said voltage supply input signal.

28. A computer implemented method of designing an integrated circuit comprising the steps of:
  selecting at least one standard cell from a standard cell library and incorporating said at least one standard cell in said integrated circuit, said at least one standard cell comprising:
  a voltage switching device having a voltage supply input and a voltage supply output and wherein said voltage supply output is switchably coupled to said voltage supply input in response to a power control input signal such that in a power on configuration of said voltage switching device said voltage supply output is coupled to said voltage supply input;

a retention switching device coupled to said voltage switching device and configured to switchably couple said voltage supply output to said voltage supply input in response to a retention enable signal such that in a retention enabled configuration of said retention switching device said voltage supply output corresponds to a retention voltage reduced relative to said voltage supply input;

wherein said retention switching device has a further voltage input from an overdrive voltage supply such that in said retention enabled configuration, said retention switching device is switched on more strongly relative to being both coupled to said voltage supply input signal and driven from said voltage supply input signal and wherein in a power off configuration of said voltage switching device said voltage supply output is determined by said retention switching device.

29. A computer implemented method of designing an integrated circuit comprising the steps of:

selecting at least one standard cell from a standard cell library and incorporating said at least one standard cell in said integrated circuit, said at least one standard cell comprising:

a retention switching device having voltage supply input and a voltage supply output and wherein said voltage supply output is switchably coupled to said voltage supply input in response to a retention enable signal such that when said coupling is enabled said voltage supply output corresponds to a retention voltage reduced relative to said voltage supply input;

wherein said retention switching device has an input from an overdriven voltage supply such that when said retention switching device is enabled it is switched on more strongly relative to being both coupled to said voltage supply input signal and driven from said voltage supply input signal.

30. A computer implemented method of designing an integrated circuit comprising the steps of:

selecting at least one standard cell from a standard cell library and incorporating said at least one standard cell in said integrated circuit, said at least one standard cell comprising:

a voltage switching device having a voltage supply input and a voltage supply output and wherein said power supply output is switchably coupled to said voltage supply input in response to a power control input signal such that in a power on configuration of said voltage switching device said voltage supply output is coupled to said voltage supply input;

wherein said voltage switching device has a further voltage input from an overdrive voltage supply such that when said voltage switching device is in a power off configuration in which said voltage supply output is decoupled from said voltage supply input, said voltage switching device is switched off more strongly relative to said voltage switching device being both coupled to said voltage supply input signal and driven from said voltage supply input signal.

31. A method of providing power control in an integrated circuit, said method comprising:

switchably coupling a voltage supply input of a voltage switching device in response to a power control input signal such that in a power on configuration of said voltage switching device a voltage supply output of said switching device is coupled to said voltage supply input;

switchably coupling said voltage supply output to said voltage supply input using a retention switching device coupled to said voltage switching device in response to a retention enable signal such that in a retention enabled configuration of said retention switching device said voltage supply output corresponds to a retention voltage reduced relative to said voltage supply input;

wherein said retention switching device has a further voltage input from an overdrive voltage supply such that in said retention enabled configuration, said retention switching device is switched on more strongly relative to being both coupled to said voltage supply input signal and driven from said voltage supply input signal and wherein in a power off configuration of said voltage switching device said voltage supply output is determined by said retention switching device.

32. A method of providing power control in an integrated circuit, said method comprising:

switchably coupling a voltage supply output of a retention switching device to a voltage supply input of said voltage switching device said voltage in response to a retention enable signal such that when said coupling is enabled said voltage supply output corresponds to a retention voltage reduced relative to said voltage supply input;

wherein said retention switching device has an input from an overdriven voltage supply such that when said retention switching device is enabled it is switched on more strongly relative to being both coupled to said voltage supply input signal and driven from said voltage supply input signal.

* * * * *